United States Patent [19]
Rochelle et al.

[11] Patent Number: 5,270,015
[45] Date of Patent: Dec. 14, 1993

[54] APPARATUS FOR REMOVING SULFUR FROM SULFUR CONTAINING GASES

[75] Inventors: Gary T. Rochelle, Austin, Tex.; Claus Jorgensen, Elliott City, Md.; John C. S. Chang; Theodore G. Brna, both of Cary, N.C.; Charles B. Sedman, Hillsborough, N.C.; Wojciech Jozewicz, Chapel Hill, N.C.

[73] Assignee: Board of Regents, The University of Texas System, Austin, Tex.

[21] Appl. No.: 741,090

[22] Filed: Aug. 6, 1991

Related U.S. Application Data

[60] Division of Ser. No. 469,804, Jan. 22, 1990, Pat. No. 5,047,221, which is a continuation of Ser. No. 163,864, Mar. 3, 1988, abandoned, which is a continuation-in-part of Ser. No. 930,171, Nov. 10, 1986, abandoned, which is a continuation-in-part of Ser. No. 928,337, Nov. 7, 1986, Pat. No. 4,804,521.

[51] Int. Cl.$^5$ .............................................. B01D 50/00
[52] U.S. Cl. .................................... 422/168; 422/172; 422/173; 96/55; 96/136
[58] Field of Search ........................ 422/168, 172, 173; 55/73, 315, 316; 423/243.08, 243.10; 106/763, 765

[56] References Cited

U.S. PATENT DOCUMENTS

| | | | |
|---|---|---|---|
| 3,131,024 | 4/1964 | Leineweber | 23/110 |
| 3,264,130 | 8/1966 | Mays et al. | 106/292 |
| 3,501,324 | 3/1970 | Kubo et al. | 106/120 |
| 3,695,836 | 10/1972 | Yang | 423/331 |
| 3,861,935 | 1/1975 | Ohnemuller et al. | 106/306 |
| 3,906,079 | 9/1975 | Tamaki et al. | 423/242 |

(List continued on next page.)

FOREIGN PATENT DOCUMENTS

| | | |
|---|---|---|
| 62-213842 | 9/1987 | Japan . |
| 396969 | 8/1933 | United Kingdom . |
| 2106087 | 4/1983 | United Kingdom . |

OTHER PUBLICATIONS

"System for Flue Gas Desulfurization by Limestone Scrubbing", (Joy Manufacturing Company Brochure), Jun. 1972.

Jozewicz et al. (1987) Proceedings: Tenth Symposium on Flue Gas Desulfurization Atlanta, Georgia, Nov. 1986, vol. 2, pp. 9-123 through 9-144.

Jozewicz et al. (1986), Environ. Prog., 5:218.

J. He et al., "Comparison of Tuff and Fly Ash in Blended Cement", 64 Am. Ceram. Soc. Bulletin, Nov. 5 (1985), at 707-711.

G. D. Reed et al., "Analysis of Coal Fly Ash Properties of Importance to Sulfur Dioxide Reactivity Potential", 18 Environ. Sci. Technol., No. 7 (1984), at 548-552.

S. L. Marusin, "Experimental Examination of Fly Ash Concrete", 6 Cement, Concrete, and Aggregates. CCAGDP, No. 6 (Winter 1984), at 126-136.

M. W. Grutzeck et al., "Mechanism of Hydration of Condensed Silica Fume in Calcium Hydroxide Solutions" (1984), at 643-664.

(List continued on next page.)

Primary Examiner—James C. Housel
Assistant Examiner—Laura E. Collins
Attorney, Agent, or Firm—Arnold, White & Durkee

[57] ABSTRACT

Apparatus for treating acid gas-containing flue gases to remove acid gases therefrom. Apparatus in accordance with the present invention include a device for heating an admixture of calcium alkali and calcium-reactive silica and/or alumina to above ambient temperatures for a period of time so as to facilitate the formation of acid gas-absorbing calcium silicates or aluminates. These apparatus further include a chamber for receiving activated absorbing components from the heater chamber wherein the activated absorbing component is admixed with gas to allow absorption of acid components therefrom. After absorption of acid components from the gas, the apparatus separates the treated gas from the spent absorbing component. Examples disclosed herein demonstrate the utility of these apparatus in achieving improved sulphur-absorbing capabilities. Additionally, disclosure is provided which illustrates preferred configurations for use in connection with coal-fired generating plants.

30 Claims, 8 Drawing Sheets

U.S. PATENT DOCUMENTS

| | | | |
|---|---|---|---|
| 3,928,539 | 12/1975 | Satoh et al. | 423/326 |
| 3,988,419 | 10/1976 | Mori | 423/155 |
| 4,073,864 | 2/1978 | Atsukawa et al. | 423/242 |
| 4,110,088 | 8/1978 | Cold et al. | 55/315 |
| 4,226,831 | 10/1980 | Dilworth | 422/173 |
| 4,279,873 | 7/1981 | Felsvang et al. | 423/242 |
| 4,305,909 | 12/1981 | Willett et al. | 422/173 |
| 4,314,980 | 2/1982 | Shen et al. | 423/331 |
| 4,344,920 | 8/1982 | Isserlis | 422/173 |
| 4,432,804 | 2/1984 | Tamura et al. | 106/306 |
| 4,481,170 | 11/1984 | Wier, Jr. | 422/168 |
| 4,533,522 | 8/1985 | Leimkühler | 422/172 |
| 4,555,392 | 11/1985 | Steinberg | 423/244 |
| 4,602,918 | 7/1986 | Steinberg et al. | 44/51 |
| 4,620,856 | 11/1986 | Rosenberg et al. | 55/73 |
| 4,629,508 | 12/1986 | Cain, Jr. et al. | 106/85 |
| 4,636,370 | 1/1987 | Dean et al. | 423/235 |
| 4,636,371 | 1/1987 | Farha, Jr. | 423/244 |
| 4,640,825 | 2/1987 | Rosenberg | 423/235 |
| 4,642,225 | 2/1987 | Leikert | 423/244 |
| 4,645,449 | 2/1987 | Schwartz et al. | 431/8 |
| 4,645,652 | 2/1987 | Kimura | 423/235 |
| 4,645,653 | 2/1987 | Kimura | 423/235 |
| 4,645,654 | 2/1987 | Barczak | 423/244 |
| 4,719,088 | 1/1988 | Itoh et al. | 422/168 |
| 4,804,521 | 2/1989 | Rochelle et al. | 423/242 |
| 5,047,221 | 9/1991 | Jozewicz et al. | 423/242 |
| 5,047,222 | 9/1991 | Rochelle et al. | 423/242 |

OTHER PUBLICATIONS

P. J. Sereda et al., "Structure formation and development in hardened cement pastes" (1980).

Yang et al. (1979), *AIChE J.* 25:811.

F. A. Ayer, "Proceedings: Symposium on Flue Gas Desulfurization Hollywood, FL, Nov. 1977 (vol. 1)", EPA-600/7-78-058a (Mar. 1978) at 278–291.

H. F. W. Taylor, "Chapter 5: The calcium Silicate Hydrates", 1 The Chemistry of Cements 167–232 (1964).

S. Brunauer, "Tobermorite Gel—The Heart of Concrete", 50 American Scientist 210–229 (1962).

S. A. Greenberg et al., "Investigation of Colloidal Hydrated Calcium Silicates. I. Solubility Products", 64 *J. Phys. Chem.* 1151 1157 (Sep. 1960).

L. Kalousek, "Tobermorite and Related Phases in the System $CaO-SiO_2-H_2O$", *J. Amer. Concrete Inst.* (Jun. 1955), at 989–1011.

L. Heller et al. "Hydrated Calcium Silicates. Part II. Hydrothermal Reactions: Lime:Silica Ration 1:1", *Chemical Society Journal* (1951), at 2397–2401.

H. F. W. Taylor, "Hydrated Calcium Silicates. Part I. Compound Formation at Ordinary Temperatures", Chemical Society Journal (1950) at 3682–3690.

H. H. Steinour, "The System $CaO—SiO_2—H_2O$ and the Hydration of the Calcium Silicates", *Chem. Reviews* (1947), at 391–459.

A. B. Cummins et al. "Diatomaceous Earth: Equilibrium and Rate of Reaction in the System Hydrated Lime-Diatomaceous Silica-Water" 26 Industrial and Engineering Chemistry, No. 6 (1934), at 688–693.

Dialog Search Report.

G. Rochelle and P. Chu, "$SO_2/NO_2$ Removal By $Ca(OH)_2$" (Oct. 16, 1986).

J. Peterson, "Kinetic Study of the Reaction: Fly Ash+$Ca(OH)_2$" (Oct. 21, 1986).

J. Peterson and G. Rochelle, "Kinetic Study of the Reaction: $Ca(OH)_2$+Fly Ash" (Apr. 14, 1987).

J. Peterson and G. T. Rochelle, "Calcium Silicate Reagents for Dry Flue Gas Desulfurization" (Oct. 14, 1987).

○ BELOW "THERMAL WINDOW"
▲ WITHIN "THERMAL WINDOW"
□ ABOVE "THERMAL WINDOW"

REACTIVITY 0.41 mole $SO_2$ mole $Ca(OH)_2$

ESTIMATED FROM 1:1 DATA

APPARATUS FOR REMOVING SULFUR FROM SULFUR CONTAINING GASES

The government may own certain rights in the present invention pursuant to EPA cooperative Agreement CR 81-1531.

This application is a division of copending application Ser. No. 07/469,804, filed Jan. 22, 1990, now U.S. Pat. No. 5,047,221, which has a continuation of Ser. No. 163,864, filed Mar. 3, 1988, now abandoned, which was a continuation-in-part of Ser. No. 930,171, filed Nov. 10, 1986, now abandoned which was a continuation-in-part of Ser. No. 928,337, filed Nov. 7, 1986, now U.S. Pat. No. 4,804,521.

BACKGROUND OF THE INVENTION

1. Field of the Invention

The present invention relates to processes for reducing the level of sulfur in a sulfur-containing gas. In particular, the invention relates to the use of improved sulfur dioxide-absorbing calcium alkali sorbents, which include a calcium-reactive alumina or silica source, in the desulfurization of sulfur-containing flue gases, and methods for improving the sulfur dioxide absorbing capabilities of such sorbents.

2. Description of the Related Art

Coal represents one of the most bountiful sources of energy in the world today. For example, it has been estimated that the known coal reserves in the U.S. alone could supply sufficient energy for domestic consumption for several hundred years. Unfortunately much of this coal contains high levels of sulfur which, when the coal is burned, is released into the atmosphere, generally in the form of sulfur dioxide. One of the most serious environmental problems associated with such sulfur emissions is the generation of atmospheric sulfuric acid, resulting in so-called "acid rain."

Attempts at controlling sulfur dioxide emissions from coal burning plants have led to the development of a number of advanced systems and processes for flue gas desulfurization. Fluidized-bed combustion, lime injection, and flue gas desulfurization are some of the examples. In these processes, limestone has been used as a sorbent which forms primarily calcium sulfate at a temperature above 700° C. Regeneration of the sorbent has been a difficult problem because of the high chemical stability of the sulfate. Yet, regeneration is desirable from the 15 points of view of conservation, cost, and ecology. As a result, a considerable amount of research effort has been expended in developing alternate sorbents which are regenerative as well as reactive to sulfur dioxide.

Fluidized bed combustion (FBC) and scrubbers for flue gas desulurization (FGD) represent two of the more promising advanced processes for power generation. FBC relates to the combustion of coal with limestone particles as the bed material, and has received increasing attention as a promising and versatile technology for clean power generation. Equally promising has been FGD, wherein sulfur-reactive sorbents are employed to remove sulfur from flue gases prior to their venting into the atmosphere. In developing the technologies for FBC and FGD, a search for sorbents more effective than limestone, especially ones which are economically regenerative, has been a challenging task.

Flue gas desulfurization by the means of spray dryer absorber and bag filter or electrostatic precipitator has recently received much attention. In the spray dryer/bag filter system, flue gas is contacted with a fine spray of an aqueous solution or slurry of a reactive alkali (typically lime), with $SO_2$ removal and drying occurring simultaneously. The sulfur dioxide is absorbed into the water droplet during the constant rate period of drying until it shrinks to the extent that the particles touch each other. During the following falling rate period, the remaining water diffuses through the pores of agglomerated particles until the solids establish pseudo-equilibrium with the humid environment of spray dryer.

The third stage of drying may be called the second-falling rate period. Any drying/mass transfer during this period is limited by the diffusion of moisture from within tightly packed particles. The first two stages take place exclusively in the spray dryer. The majority of pseudo-equilibrium period occurs in the duct joining spray dryer and bag filter and in the bag filter itself. Since not all moisture is removed from the solids in the spray dryer, the remaining moisture promotes further removal of $SO_2$ in the bag filter. Therefore the total $SO_2$ removal in the system is a sum of removal in the spray dryer and bag filter.

The recycle of product solids is among the options that have been tested to increase the utilization of reagent. Reports indicate that recycle of product solids and fly ash results in substantial improvement of reagent utilization and $SO_2$ removal. This option provides a higher $Ca(OH)_2$ concentration in the slurry feed at the same $Ca(OH)_2$ stoichiometry (moles of $Ca(OH)_2$ fed to the system/moles of $SO_2$ in the feed gas). In one pilot plant, increasing the recycle ratio (g solids recycled/g fresh $Ca(OH)_2$) from 6:1 to 12:1 increased $SO_2$ removal in the spray dryer from 70% to 80% at stoichiometry 1.0 (Blythe et al., 1983, *Proceedings: Symposium or Flue Gas Desulfurization*, Vol. 2, NTIS PB84-110576). In another installation, compared to once-thru tests, recycle tests gave 10 to 15% more $SO_2$ removal at stoichiometry 1.5 (Jankura et al., presented at the *Eighth EPA/EPRI Symposium on Flue Gas Desulfurization*, New Orleans, La., 1983).

Another option enhancing lime utilization uses the recycle of both solids captured downstream in the spray dryer and solids from the baghouse. However, removal does not appear to be significantly different when either spray dryer solids or fabric filter solids are employed as the recycled material. At stoichiometry 1.0 the removal increased from 53% when no recycle was employed to 62% with 0.5:1 recycle ration When ash content in the feed slurry increased from 5% to 20%, $SO_2$ removal in the spray dryer increased from 80% to 92% for stoichiometry 1.6 (Jankura et al., 1983).

Felsvang et al. U.S. Pat. No. 4,279,873, relates several experiments investigating the effects of fly ash recycle and proved it to be beneficial for $SO_2$ removal in a spray dryer. It was found that substantially higher removal of $SO_2$ may be achieved when recycling the fly ash and $Ca(OH)_2$ than when recycling $Ca(OH)_2$ alone. Corresponding efficiencies for stoichiometry 1.4, 500 ppm inlet $SO_2$, and comparable solids concentration were 84% and 76%, respectively. For the same stoichiometry and $SO_2$ concentration, removal was only 67% for the simple once-thru process. At low $SO_2$ concentration and high recycle ratios, over 90% removal was achieved even at extremely low stoichiometries. At 548 ppm $SO_2$, 25:1 recycle, 0.76 stoichiometry and at 170 ppm SO$_2$, 110:1 recycle, 0.39 stoichiometry, SO$_2$ removal was 93.8% and 97.8%, respectively.

Removal efficiencies up to 65% were reported with a slurry of highly alkaline (20% CaO) fly ash only (Hurst and Bielawski, *Proceedings: Symposium on FGD*, EPA-600/9-81-019b, 835–860, 1980). In another experiment, 25% SO$_2$ removal was achieved when spraying slurred fly ash collected from a boiler burning 3.1% sulfur coal (Yeh et al., Proceedings: Symposium on Flue Gas Desulfurization, EPRI CS-2897, 821–840, 1983). A weak trend was found in a study of 22 samples of fly ashes that a slurry with a higher total slurry alkalinity tended to have a higher SO$_2$ capture (Reed et al., *Environ. Sci. Technol.* 18, 548–552, 1984).

Therefore, while it is clear that desulfurization processes employing flue gas scrubbers represents an important advance, it is equally clear that such techniques presently have economic and technical drawbacks, not the least of which is the low degree of reagent utilization. While recycle of product solids with fly ash has resulted in some improvement, such processes are still not economically feasible for certain applications, and much room remains for the improvement of reagent utilization in such systems.

SUMMARY OF THE INVENTION

Accordingly, the present invention is directed to improved processes for reducing the level of sulfur in a sulfur-containing gas which in their most general and overall scope include four basic steps. One step involves the preparation of an aqueous slurry comprising a calcium alkali together with a calcium-reactive silica or alumina which are present in amounts sufficient to allow for the formation of a sulfur dioxide-absorbing component which includes a calcium silicate or calcium aluminate. Virtually any composition which includes a calcium alkali (CaO or Ca(OH)$_2$) may be employed in the practice of the present invention. For example, calcium alkali in the form of lime, slaked lime, hydrated lime, calcidic lime, dolomitic lime, calcium hydroxide or calcium oxide may be employed. For economic reasons, due to its lower cost, a preferred embodiment of the present invention employs lime or slaked lime.

Similarly, virtually any composition which includes a calcium reactive silica or alumina may be employed, wherein a calcium-reactive silica or alumina is defined as a source of silica or alumina which is readily soluble in alkaline solutions. Such compositions include, but are not limited to, fly ash, diatomaceous earth, clay, bentonite, montmorillonite, activated alumina, or silicic acid. Again, for economic reasons, one would generally employ fly ash in that fly ash is a natural by-product of coal combustion and is therefore readily available at coal burning power plants. Thus, fly ash may be included in the slurry in the form of spent solids.

Although some degree of sulfur absorption may be obtained with slurries which contain virtually any mass ratio of calcium reactive silica or alumina to calcium alkali, in one embodiment, mass ratios ranging from about 1:1 to about 16:1, respectively, are preferred. In a more preferred embodiment, the slurry comprises a mass ratio of calcium reactive silica or alumina to calcium alkali from about 1:1 to about 5:1, respectively.

As with mass ratio, the total amount of solids which are slurried is not of critical importance. However, the total solids amount will generally be determinative of the amount of sulfur which is removed from the gas by the slurry. Typically, about one to three moles of calcium alkali is added for every mole of sulfur to be removed from the gas. However, in a more preferred embodiment, the slurry comprises about one to two moles of calcium alkali for every mole of sulfur to be removed from the gas.

In a further embodiment, the slurry also includes sodium hydroxide in a concentration ranging from about 0.03 molar to about 1 molar. More preferably, the slurry comprises about 0.05 to about 0.5 molar sodium hydroxide. Even more preferably, the slurry comprises sodium hydroxide in a concentration ranging from about 0.1 molar to about 0.25 molar. Therefore, typically, the slurry will comprise about 0.02 to 0.3 moles of sodium hydroxide for every mole of calcium alkali. Or more preferably, 0.05 to 0.2 moles of sodium hydroxide for every mole of calcium alkali.

Another step of the most general process of the present invention involves heating the slurry to a temperature above ambient in a manner to facilitate the formation of the sulfur dioxide-absorbing component. Virtually any increase in temperature of the slurry over ambient, as well as increases in slurrying time, will result in an improved sulfur dioxide absorbing slurry. The upper temperature limit is bounded only by temperatures at which the calcium reactive silicates or aluminates will become dehydrated. Generally, such dehydration will occur at temperatures above 200° centigrade. It is believed that dehydrated calcium silicates or aluminates will not prove as advantageous in sulfur absorption as hydrated calcium silicates or aluminates. Moreover, extremely high slurrying temperatures (for example, above 200° C.) will generally prove to be uneconomic in commercial practice.

Accordingly, in the practice of the invention, the slurry is heated to between about 40 and about 200° C. for between about 0.5 and about 48 hours. In one embodiment, the slurry is heated to between about 40° and about 60° C. for between about 2 and about 36 hours. More preferably, the slurry is heated for between about 4 to about 12 hours. In another embodiment, the slurry is heated to between 60° and about 80° C. for between about 1 and about 24 hours. More preferably, the slurry is heated at such temperatures for between about 2 and about 12 hours. In still another embodiment, the slurry is heated to between about 80° and about 100° C. for between about 0.5 and 12 hours. More preferably, the slurry is heated to such temperatures for between about 1 and about 8 hours.

In more preferred embodiments of the invention, the slurry is activated at temperatures between about 100° and about 200° C. It has been surprisingly discovered by the present inventors that heat treatment of mixtures of calcium alkali and calcium-reactive silica at temperatures above 100° and below 200° C. provides a sorbent having a reactivity almost four-fold higher than that provided by treatments at elevated temperatures below 100° C. Even more importantly, maximal activation of the sorbent mixture may be obtained in the range of 100°–200° C. in a much shorter time than at lower temperatures. For example, the reactivity of a lime/flyash sorbent can be doubled in less than an hour when activated at between about 140°–160° C. whereas treatment at 50°–80° C. requires generally 9–12 hours to achieve a doubling. Moreover, the surprisingly short activation time realized at temperatures in the 100°–200° C. range actually makes such high temperature treatment more economical than treatments at lower temperatures.

Thus, in general it has been noted, that the temperature to which the slurry is heated and maintained is inversely proportional to the amount of time necessary to obtain highly sulfur-reactive calcium silicates and aluminates.

Another step of the most general process requires contacting gas with the heat-treated slurry in a manner sufficient to allow for absorption of sulfur-dioxide by the absorbing component. Numerous embodiments are known in the art for performing such a contacting step. In one embodiment, the contacting step includes atomizing the slurry into a stream of the sulfur-containing gas, drying the resulting atomized droplets so as to form a gas/solid suspension having a gaseous component and a solid component which solid component includes the sulfur-dioxide-absorbing component, and retaining the gaseous and solid components in contact in a manner sufficient to allow for the absorption of the sulfur dioxide by the absorbing component.

In another embodiment, the contacting steps further includes directing the gas/solid suspension onto a reaction surface to allow for deposition of the solid component onto the surface, and passing the suspension over the deposited solid component in order to: 1) further effect absorption of the sulfur-dioxide by the absorbing component, 2) effect a separation of the gas from the solid component and, 3) further effect a drying of the solid component. Typically, the reaction surface will include a bag filter. However, in certain embodiments which do not employ a bagfilter, the process includes carrying the gas/solid suspension in a stream to allow for substantial contact between the gaseous and solid component and separating the solid component from the gas by means of an electrostatic precipitator or cyclones. Therefore, the bagfilter, electrostatic precipitator and cyclone offer alternative means for separating sulfur-absorbed solids from the gas. However, as will be appreciated, the bagfilter alternative offers the additional benefit of providing a reaction surface particularly well adapted to the practice of the present invention.

Due to economic and other considerations, one should typically employ a recycling of a portion of the sulfur-absorbed solids back to the aqueous slurry. This will achieve not only a partial regeneration of the sulfur absorbed solids but will also improve the performance, and economics, of the process. Therefore, the process can be seen as a cyclical process wherein a portion of sulfur absorbed solids are recycled to form a slurry which includes an admixture of sulfur absorbed solids and the calcium alkali. Since flue gas itself will typically contain sufficient fly ash content, there is generally no need to add fly ash directly to the slurry, it being added in the form of spent solids.

In a preferred process embodiment directed primarily to dry injection technology, the steps of preparing an aqueous slurry, and heating the slurry, are the same as in the general overall embodiment. However, following heating of the slurry, for dry injection purposes, the slurry is dried to provide a solid component which includes the sulfur dioxide-absorbing component, prior to contacting the gas with the sulfur dioxide-absorbing material. In this embodiment, it has been found that the gas must be conditioned to a relative humidity of between about 5 and 95%. Additionally, the temperature of the hot flue gas must be conditioned to between about 120° and 140° C. preferably, the relative humidity of the humidified gas is brought to between about 20% and 80% and its temperature to between about 60 and 100° C. More preferably, the relative humidity of the humidified gas is brought to between about 30% and 70% and its temperature is reduced to between about 65° and 85° C. It will be appreciated that the most convenient means of achieving a humidification of a gas, and temperature reduction of gas, will be through the utilization of water, for example, mixed with the gas in a humidifier, prior to contacting the gas with the solid component. However, other methods of conditioning could be employed as exemplified by cooling of the flue gas or by steam injection into the flue gas.

Another step in the dry injection process involves contacting the humidified gas with the dried or partially dried solid component to form a gas/solid suspension, for a period of time sufficient to allow some absorption of gaseous sulfur dioxide by the solid component, and separating the solid component from the gas in the form of spent solids. This step can be achieved by the previously mentioned contactors and/or separators including bagfilter, electrostatic precipitators (ESP), and cyclones.

More particular aspects of the present disclosure relate to the preparation of improved sorbents produced at elevated temperature ranges. It has been discovered that sorbents produced at selected elevated temperatures under pressure possess particularly high surface area and a surface structure which renders them significantly more reactive than sorbents produced at lower temperatures. In particular, it has been found that calcium silicate sorbents prepared through the admixture of a calcium alkali together with a calcium reactive silica or alumina source posses surprisingly good sorbent properties when heat treated at temperatures between about 100° C. and about 200° C., and at pressures above atmospheric pressure. This temperature range is critical to the preparation of the most highly reactive sorbent in that calcium silicate hydrates prepared outside of this range are not nearly as reactive.

When the temperature and pressure of calcium silicate hydrates formation process are carefully controlled to meet the "thermal window" requirements, an amorphous material with high surface area is produced which is very reactive toward $SO_2$ If the temperature is lower, for example, below 100° C., the surface of this gel-like, amorphous material is less than fully developed and results in lower reactivity to $SO_2$. Conversely, if the temperature is too high, for example, above 200° C., the product morphology changes into a framework of distinct needle-shaped crystals. The well crystallized needle-shaped calcium silicate hydrates are similarly found not as reactive toward $SO_2$.

Typically, the calcium silicate hydrates are prepared as an aqueous mixture of a calcium alkali containing material such as lime and a calcium-reactive silica containing material such as fly ash, diatomaceous earth, clay or recycled solids. Preferably,, this aqueous mixture exists as a slurry, containing moisture greater than about 60 wt %. If fly ash and lime are used as the raw materials, the typical weight ratio is preferably in the range of 1:1 to 3:1. The slurry should be maintained well mixed at a controlled temperature and pressure on the order of about 100° to 200° C., and between about 15 to about 220 psia, for at least about 10 to 15 minutes. For the case of fly ash/lime mixture, the preferred thermal window employs a temperature controlled in the range of about 140 to 160° C. for a minimum of 20 minutes with pressure in the range of about 20 to 100 psia. After heating and mixing, the slurry can be dried by conventional dewatering/drying procedures such as filtration/centrifuge, oven drying, spray drying, or spin flash drying to produce a well-dispersed, fine powder well suited for dry flue gas desulfurization purposes.

The present invention is also directed to an apparatus for reducing the level of sulfur in a sulfur-containing gas which apparatus includes a means for slurrying an aqueous suspension, which suspension includes a sulfur dioxide-absorbing component, the slurry means further including a means for elevating the temperature of the suspension to above ambient; a means for admixing the gas with the aqueous suspension to provide a gas/liquid suspension; a means for drying the gas/liquid suspension to provide a gas/solid suspension; a means for separating the gas/solid suspension to provide a gaseous component and a solid component; and means for venting the treated gas; wherein the temperature elevating means is positioned in a manner to elevate the temperature of the suspension prior to admixture of the suspension with the gas by the admixing means.

As noted, slurry tanks in accordance with the present apparatus should also include a means for heating the slurry in a manner to conform with the processes of the present invention. For example, heating means in the form of an electrical heating element, steam driven heat exchanger, an aqueous preheating step or a steam injector are believed to work well in this regard. However, any method of heating the slurry to the desired temperatures for the desired time periods will suffice in the practice of the present invention.

In one embodiment, the admixing means comprises a rotary atomizer for atomization of the slurry into the gas. While a rotary atomizer is a preferred means for admixing the gas, other means may also be employed including, but not limited to, a fluid atomizer.

In the present apparatus, drying may be achieved in either one or two steps. In an apparatus adapted for practicing this two-step drying process, a drying function in the form of a spray dryer is provided in a housing which houses the rotary atomizer. In such housing, generally an almost total drying of the gas/liquid suspension is achieved. The dried gas/solid suspension is carried in a stream to a second absorption stage, which includes, for example, a pulse-jet baghouse for further reaction between the sulfur dioxide absorbing component and the sulfur-containing gas, to further achieve drying of the gas/solid suspension, and to separate dried spent solids, containing sulfur-absorbed solids, from the gas. In a one-step drying procedure, a bagfilter alone will generally prove satisfactory.

However, in certain embodiments, for example, retrofit application to existing embodiments, an electrostatic precipitator or cyclone may be employed in place of a bagfilter.

Lastly, the apparatus includes a means for venting the treated gas into the atmosphere, for example a venting stack.

The present invention is also directed to an apparatus which is particularly suited to the dry injection of solids to humidified gas. In this apparatus, a drying means is provided to dry the slurry after it has been heated in accordance with the present invention, but prior to admixture of the slurry with the gas. In this embodiment, the drying means can be employed in the form of a fluidized bed, flash dryer, spray dryer, or other such means known in the art. The drying means may also employ a dewatering device, for example a vacuum device, before the primary drying means.

The dry injection apparatus will further include a means for humidifying the gas and means for admixing the humidified gas with the solid component to provide a gas/solid suspension. The humidifying means will typically be in the form of a humidifying chamber wherein, for example, an atomizer is employed to atomize water into the gas and thereby achieve both humidification and reduction in the temperature of the hot flue gas. The admixing means will generally be in the form of a dry sorbent injector system as is commonly known in the art. The separating means (for example, a baghouse or electrostatic precipitator) can be employed as in the general embodiment.

DETAILED DESCRIPTION OF THE INVENTION

The $CaO$—$SiO$—$Al_2O_3$—$H_2O$ Sulfur Absorption System

Figure 1:
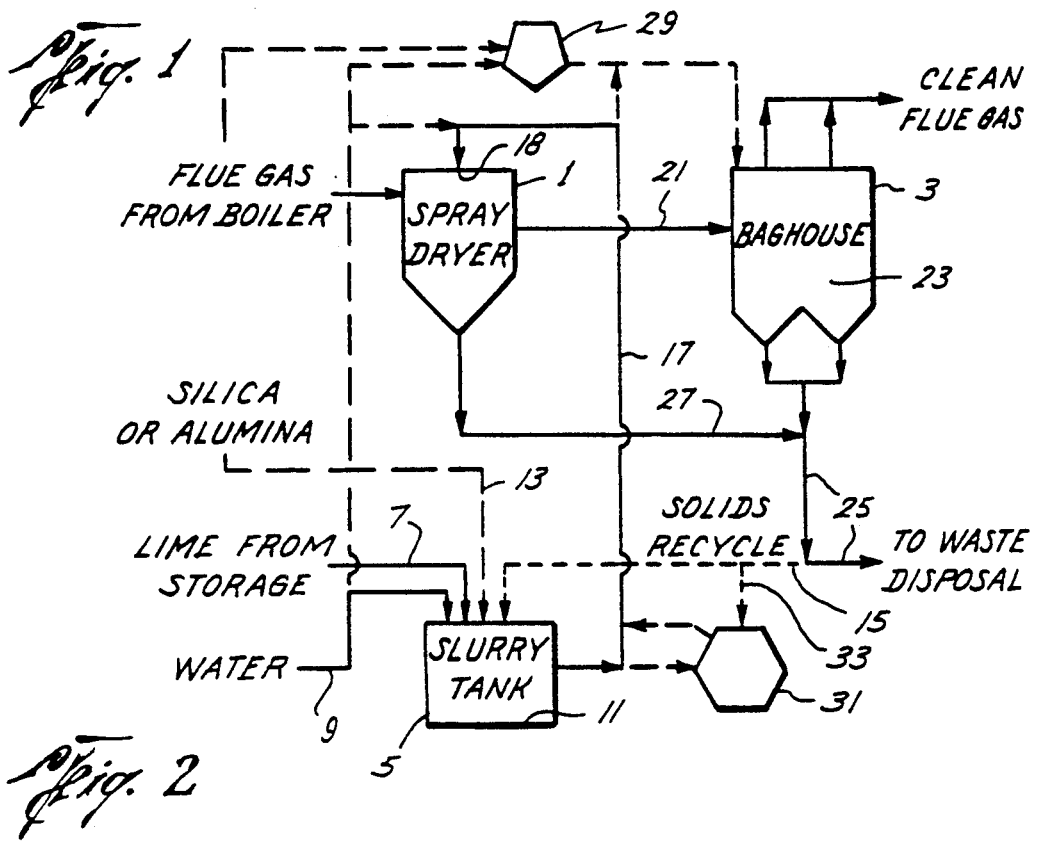
FIG. 1. Schematic Diagram of a Spray Dryer System.

The nature of calcium silicate hydrate and calcium aluminate hydrate as well as calcium aluminate silicate hydrate formation in $CaO$—$SiO_2$—$Al_2O_3$—$H_2O$ systems is very complicated. It is usually impossible to assign a simple chemical formula to it, especially at ordinary temperatures of interest in flue gas desulfurization. At temperatures from 20° C. to about 100° C., two main calcium silicate hydrates are formed, mono- and dicalcium silicate hydrates. Their ratio appears to depend on the initial ratio of calcium to silica in the slurry. Both monocalcium silicate hydrate—$CaOxSiO$— and dicalcium silicate hydrate—$(CaO)_2xSiO_2xH_2O$—are fibrous gels of specific surface areas in the range of 100-300 m$^2$/g. At 20°-100° C. after 8 hours of hydration, tobermorites (calcium silicate hydrates) may crystallize, also of high surface area.

The reaction of fly ash and $Ca(OH)_2$ in the presence of water is called a pozzolanic reaction. A pozzolan is a siliceous or siliceous and aluminous material which in itself possesses little or no cementitous value but will, in finely divided form and in the presence of moisture, chemically react with calcium hydroxide at ordinary temperatures to form compounds possessing cementitous properties. Due to small particle size and generally noncrystalline character, fly ash usually shows pozzolanic properties, or pozzolanic and cementitous properties in case of high-calcium ashes. High-calcium fly ash contains tricalcium aluminate hydrate, which is the most reactive mineral present within portland cement. Pozzolanic reactions give products with cementitous properties and with high surface area that can enhance $SO_2$ removal.

Pozzolan originated as a mortar of lime and ash (from Pozzouli, Italy) which the Romans used for stone constructions. The definition of pozzolanic reaction implies that spray dryer off-products, fly ashes, clays, and sands should be able to provide components to form calcium silicate hydrates, calcium aluminate hydrates,calcium alumino-ferrite hydrates, calcium sulfo-aluminate hydrates (ettringites), and calcium sulfo-aluminate-ferrite hydrates. However, not all siliceous and aluminous minerals are pozzolans. Crystalline minerals (mullite, silica as quartz) do not react with lime, especially at ordinary temperatures. Siliceous and/or aluminous materials must be non-crystalline and in small particles, in order to provide silica and alumina, after hydration in alkaline solutions, to form cementitous products. These reactions are the ones which constituents of portland cement undergo in the presence of water. The hydration reaction of aluminates in the presence of gypsum and lime and reaction of calcium silicates are as follows:

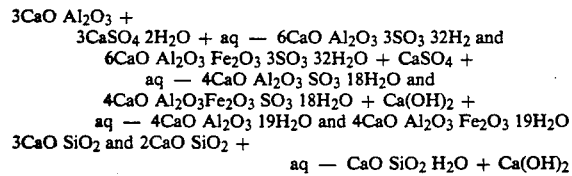

$3CaO\,Al_2O_3 +$
$\quad 3CaSO_4\,2H_2O + aq \to 6CaO\,Al_2O_3\,3SO_3\,32H_2$ and
$\quad 6CaO\,Al_2O_3\,Fe_2O_3\,3SO_3\,32H_2O + CaSO_4 +$
$\quad aq \to 4CaO\,Al_2O_3\,SO_3\,18H_2O$ and
$\quad 4CaO\,Al_2O_3Fe_2O_3\,SO_3\,18H_2O + Ca(OH)_2 +$
$\quad aq \to 4CaO\,Al_2O_3\,19H_2O$ and $4CaO\,Al_2O_3\,Fe_2O_3\,19H_2O$
$3CaO\,SiO_2$ and $2CaO\,SiO_2 +$
$\quad aq \to CaO\,SiO_2\,H_2O + Ca(OH)_2$ Typical portland cement consists of 50% tricalcium silicate, 25% dicalcium silicate, 10% tricalcium aluminate, 9% calcium alumino-ferrite, and 6% calcium sulfate. Tricalcium silicate appears to be the most reactive mineral present within the portland cement. The main product of hydration of portland cement's silicate materials is calcium silicate hydrate of colloidal dimensions. All calcium silicate hydrates are fibrous gels in early stage of formation and their surface area is in the range of 100-300 m$^2$/g. Moreover, Tobermorite gel plays a vital role in establishing the strength of concrete.

When considering the spray dryer/bag filter system, typically one is dealing with fly ash as a source of silica instead of amorphous silica. The solubility of quartz particles of 3-15 um diameter in water is 11 ppm at 25° C. and 60 ppm at 100° C. The corresponding values for amorphous silica are 130 ppm and 420 ppm, respectively. Temperature and pH have strong effects on the solubility of amorphous silica. When pH was adjusted with NaOH up to 10.5 from 7 at 25° C., solubility was found to increase to 1000 ppm. Above a pH of 10.7, all the solid phase of amorphous silica dissolves to form soluble silicate. Therefore it would be reasonable to expect the dissolution of fly ash to be the limiting step in the formation of calcium silicate hydrates. Because of the lower solubility of fly ash, the specific surface area of the $Ca(OH)_2$/silica reaction product is smaller than values reported for laboratory studies with amorphous silica. Also, it is not clear whether the development of the specific surface area of the product of hydration (for a given ratio of $Ca(OH)_2$/fly ash) increases proportionally to the amount of conditioned lime.

Because of low fly ash reactivity it is often desirable to know the exact characteristics of fly ash to b used. Usually fly ashes are divided into two categories: low-calcium (containing less than 5% of analytical CaO) from burning bituminous or anthracite coals and high-calcium (up to 35% Ca) from burning lignite or subbituminous coals. However, from the point of perspective reactivity and formation of calcium silicate hydrates, it is generally more important how much more amorphous material there is within the fly ash as compared with crystalline substances. Higher contents of crystalline phases (alpha-quartz, mullite, sillimanite, hematite, magnetite) lowers the reactivity of fly ash. Low-calcium fly ashes consist mainly of aluminosilicate glass due to the high proportions of silica and alumina. However, some crystallization takes place in the boiler when fly ash is cooling and, as a result, crystalline phases are detected under glass.

For high-calcium fly ash it appears that the glass structure is different. It has been postulated that it is composed of significant amounts of CaO & $Al_2O_3$, which is known to be highly reactive. Since the non-crystalline component comprises sometimes as much as 80% of high-calcium fly ash it seems that the reason for high reactivity of high-calcium fly ash may be in the composition of glass. On the other hand, higher contents of unburnt carbon in the low-calcium fly ash may add to its reactivity. These carbon particles are usually of high internal surface area and may bind water and admixtures when the fly ash is slurried.

In a study of surface area and porosity of fractionated fly ash from burning low-sulfur, high-ash coal, the largest fraction (>125 um) had a surface area of 9.44 m$^2$/g the finest fraction (>7 um) had a surface area of 1.27$^2$/g. Since large particles constitute a small fraction of fly ash only, the above effect is relatively insignificant. Industrial experiments should outperform laboratory tests, since it has been found that high-calcium fly ash passed the lime pozzolanic activity test when 20 commercial source of lime was used, but failed to do so in the presence of a reagent grade $Ca(OH)_2$. This effect is possibly the result of impurities in lime which have formed poorly-crystallized hydrates.

The prospect of having calcium silicate hydrates in the spray dryer/bag filter therefore appears to be very attractive since they have high surface area and are highly hydrated and therefore should offer high $SO_2$ removal potential. The formation would take place in the recycle system, specifically in the reactant tank. During fly ash recycle in dry flue gas desulfurization systems, reaction of fly ash with makeup Ca(OH)$_2$ probably takes place in several steps. First lime would be dissolved, then silica and alumina—originally contained within the fly ash—would be digested and, by the means of providing favorable slurrying conditions, calcium silicate/aluminate hydrates would be formed.

System Overview

Referring to FIG. 1 is seen a diagram of a typical spray dryer system which is particularly well suited to the practice of the processes of the present invention. Depicted therein is a spray dryer 1, a baghouse 3, and a slurry tank 5. The slurry tank 5 is adapted to receive calcium alkali, in the form of, for example, lime from storage by means of conduit 7, and water by means of conduit 9. The slurry tank further includes a heating element 11 adapted to heat the slurry for times and to temperatures in accordance with processes of the present invention. The system may be adapted to provide calcium reactive alumina or silica directly to the slurry from storage by means of conduit 13 or, alternatively, calcium reactive silica or alumina is supplied to the slurry tank 5 by means of a recycle conduit 15 containing a sulfur-absorbed solids recycle, which includes, for example, fly ash from the boiler.

To obtain best results, the slurry tank 5 is designed to mix a mass ratio of water to solids ranging from 1:1 to 20:1. Moreover, the slurry tank 5 and heating element 11, are adapted so as to enable a heating of the slurry to a temperature ranging from about 40° C. to about 140° C. for between about 0.5 to about 48 hours.

The heat-treated slurry is conveyed to the spray dryer 1 by means of conduit 17. In the spray dryer 1, the slurry is admixed with flue gas from the boiler by means of a rotary atomizer 19. The gas/slurry mixture is partially dried in the spray dryer 1 which is typically designed to achieve a gas/slurry contact time of between about 2 and about 10 seconds. In addition, a partial absorption of sulfur by the slurry is achieved in the spray dryer 1.

From the spray dryer 1, the partially dried particles sulfur-absorbed gas/slurry admixture is conveyed to the baghouse 3 by means of conduit 21, wherein further drying and further absorption of sulfur by the sulfur-adsorbing component of the slurry takes place. Within the baghouse 3, the gas/slurry mixture is directed onto a bagfilter 23 wherein sulfur-absorbed solids are deposited and further absorption and drying takes place. The bagfilter 23 thus serves a dual purpose of separating gas from dried solids and collecting the solids for disposal by means of conduits 25, or recycle of solids by means of conduit 15. Separated gases are vented by means of conduit 29. Solids collected in the spray dryer are mixed with baghouse solids by means of conduit 27. Typically, the baghouse 3 and bagfilter 23 are designed to achieve a residence time of between about 5 and 300 minutes.

In system embodiments for use in conjunction with dry injection of solids, the system will typically include a humidifier 29 in place of the spray dryer 1, wherein hot flue gas is admixed with water to provide humidified, cooled gas. Moreover, the system would also further include a drying tank 31 wherein the slurry is dried prior to admixture of the dried slurry with the humidified gas. Additionally, the dry injection system may include a recycle conduit 33 for admixture of recycled solids with the slurry mixture in the drying tank 31, to further assist in drying the slurry mixture. Alternatively, the spray dryer 1 itself can serve as a combination humidifier and injector wherein the dried slurry is injected into the spray dryer 1 along with water to provide admixture of the dried slurry together with the water and the gas.

EXAMPLE I: LAB SCALE EXPERIMENTS

Apparatus

Figure 2:
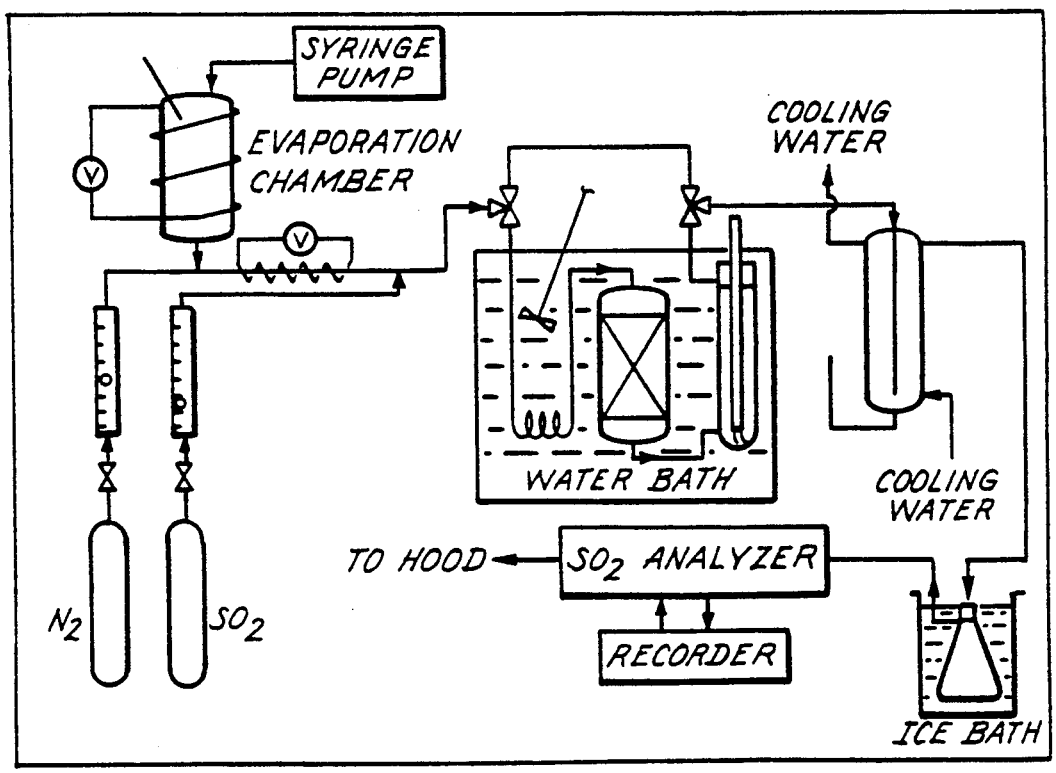
FIG. 2. Experimental apparatus.

Experiments were conducted in the apparatus shown in FIG. 2. The glass reactor (40 mm in diameter, 120 mm in height) was packed with a powdered reagent mixed with 40 g of 100 mesh silica sand to prevent channelling of Ca(OH)$_2$. The reactor was immersed in a water bath thermostated to within approximately 0.1° C. Simulated flue gas was obtained by mixing nitrogen and sulfur dioxide from gas cylinders. The flow of gas was monitored using rotameters. Water was metered by a syringe pump, evaporated, and injected into dry gas. Reactor upstream tubing was heated to prevent the condensation of the moisture.

Before entering the analyzer, the gas was cooled and water condensed in an ice bath. The SO$_2$ concentration was measured with a pulsed fluorescent SO$_2$ analyzer (Thermo-Electron Model 40). A bypass of the reactor was provided to allow preconditioning of the bed and stabilization of gas flow at the desired SO$_2$ concentration. Prior to each run the bed was humidified by passing pure nitrogen at a relative humidity of about 98% for 6 minutes and then pure nitrogen at a relative humidity at which the experiment was to be performed for 10 minutes.

Most of the experiments were performed at a relative humidity of 54% with some experiments at 17% and 74%. At typical flue gas conditions, 17, 54, and 74% relative humidity corresponds to 38, 9.5, and 4.7° C. approach to saturation, respectively. Reactor temperature was 95, 66, and 64.4° C. for 17, 54, 74% relative humidity, respectively. Common purity (99.5%) nitrogen at 4.6 l/min (0° C., 1 atm) was used as a carrier gas. The nominal concentration of SO$_2$ was 500 ppm and exposure time of the sample to the sulfurized gas was 1 hour.

Preparation of the Samples

The sample preparation consisted of two essential steps: stirring and drying. In every experiment 0.4 of reagent grade Ca(OH)$_2$ was used. This amount of lime was slurried with fly ash or other additive at the desired weight ratio. The water to solids ratio was between 10:1 and 20:1—most often 15:1. A propeller stirrer at 350 rpm was used to agitate the slurry. Slurrying time varied from 2 to 24 hours and the temperature of the slurry was set at 25 to 92° C.

Two different methods of sample preparation was used during this study. In atmospheric drying, samples were not filtered after slurrying and were dried overnight in an atmospheric over at 85°-90° C. It took several hours to evaporate the water. The new drying procedure—vacuum drying—was introduced to minimize the additional reaction time of a wet sample in high oven temperature (85°-90° C.). In this method the samples were vacuum filtered (about 5 min) and subsequently vacuum dried (about 10 min) at 95° C. The time of vacuum filtering and drying depended on the fineness of the sample and was monitored by the thermocouple placed in the dried sample and connected to the temperature recorder. In this way the moment when all the free moisture was evaporated could be easily seen and vacuum drying stopped, therefore minimizing the residence time of the sample in the oven.

Characterization of the Samples

Four different fly ashes were slurried with $Ca(OH)_2$. The characterization of fly ashes is given in Table I. During the experiments on slurrying conditions, a new batch of fly ash IV was used. It was obtained from the same vendor and was produced by burning coal from, reportedly, the same source. These samples were characterized by scanning electron microscopy (SEM). The composition of the particles has been found using Kevex Micro-X 7000 X-ray Energy Spectrometer (XES). Mean particle size

TABLE I

| | Fly Ash Characterization | | | | |
|---|---|---|---|---|---|
| Fly Ash | I | II | III | IV | |
| Power Plant | Bull Run Plant TVA | Gibson Plant Public Service of Indiana | Seminole Electric Coop. Palatka, Fl | San Miguel Electric Coop. San Miguel, TX | |
| Coal Type | bituminous | bituminous | bituminous | lignite | |
| XES Analysis [weight %] | | | | | |
| CA | 34 | 5 | 4 | 11[1] | 15[2] |
| Si | 42 | 41 | 59 | 66 | 68 |
| Fe | 6 | 31 | 15 | 4 | 2 |
| Al | 16 | 20 | 20 | 18 | 14 |
| Mass Median Particle Size [um] | 19 | 9 | 14 | 10 | 10 |

[1]Old Batch
[2]New Batch

The Effect of Fly Ash Type and Ratio

Figure 3:
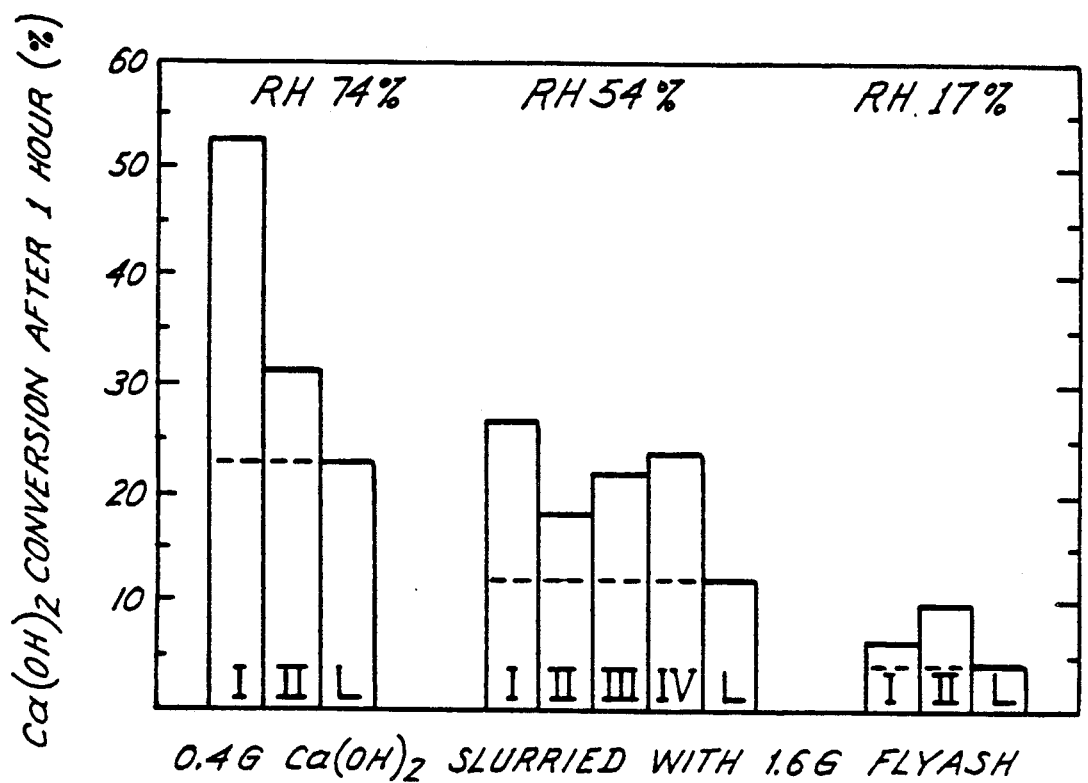
FIG. 3. The effect of fly ash I, II, III, and IV and relative humidity on $Ca(OH)_2$ utilization. 0.4 g of $Ca(OH)_2$ slurried with 1.6 g of fly ash I for 4 hours at 65° C. Atmospheric drying used for the preparation of samples. $L = Ca(OH)_2$ alone.

Four samples of fly ash were slurried with 0.4 g of lime at a fly ash loading of 4 (4 g fly ash/g $Ca(OH)_2$) for 4 hours at 65° C. and reacted at a relative humidity of 54% (RH 54%). Atmospheric drying was used for the preparation of samples. The samples having the best and the worst performance at RH 54% were also tested at the extreme humidities of 17% and 74%. The results of these experiments are presented in FIG. 3. Also shown in FIG. 3 are the conversions when lime only was exposed to the sulfurized gas. As can be seen, all fly ashes improved the utilization at every RH investigated. Samples with fly ash loading of 16 (slurried at the sam conditions as above) enhanced utilization of RH 54% to a greater extent than was the case for fly ash loading of 4. The utilization of lime was 67, 79, 65, 71% when fly ash I, II, III, IV was used, respectively. These values were much higher than the ones presented in FIG. 3. Based on these two series of experiments no correlation was found between $SO_2$ removed and calcium content of fly ash sample. SEM photographs of the mixtures of $Ca(OH)_2$ with fly ash II, III, and IV at fly ash loading of 4 demonstrated a highly irregular deposit covering the spherules of fly ash in every picture.

Fly ash I was selected to test the effect of fly ash loading on the utilization of lime. The results of experiments at RH 54% are presented in FIG. 4. The conversion of $Ca(OH)_2$ increased with increasing loading of fly ash. The increase of fly ash loading from 0.5 to 20 increased the $Ca(OH)_2$ utilization from 17 to 78%. An SEM photograph of fly ash I slurried with $Ca(OH)_2$ at the low loading of 0.5 demonstrated that the deposit is very slight and unreacted chunks of $Ca(OH)_2$ were seen next to fly ash particles.

The Effect of Reagent Grade Additives

Figure 5:
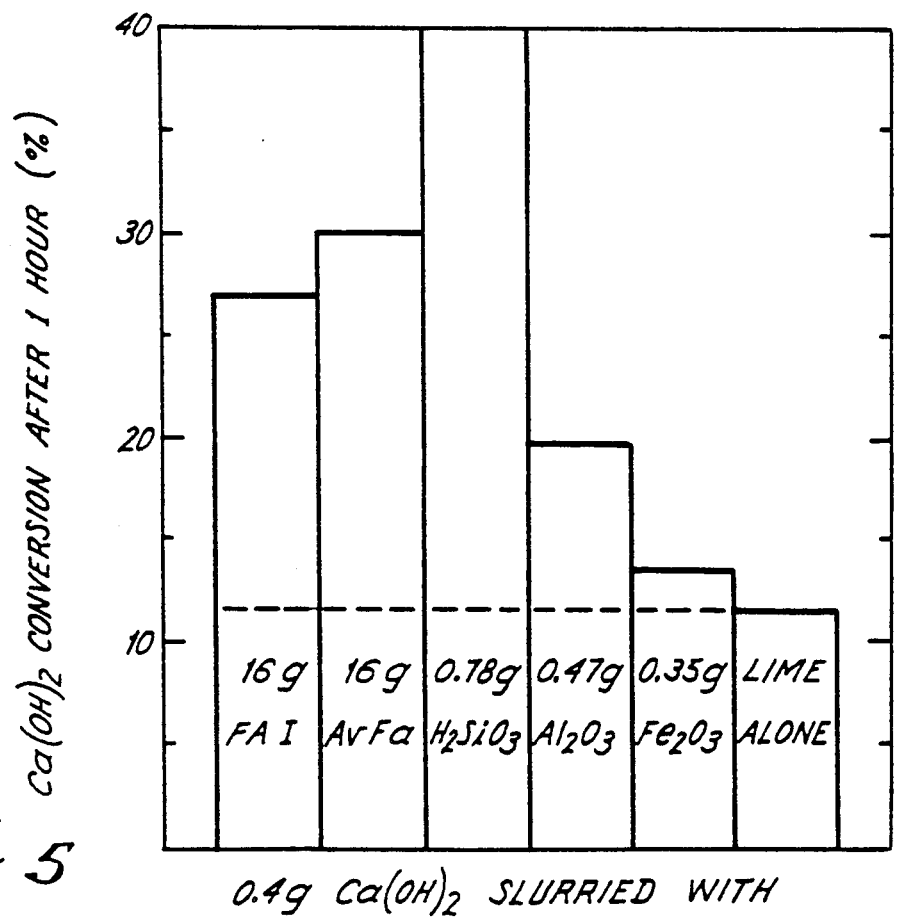
FIG. 5. A fly ash simulation experiment carried out at 54% RH. Samples of simulated fly ash (Av.Fa), $H_2SiO_3$, $Al_2O_3$, and $Fe_2O_3$ slurred with $Ca(OH)_2$ for 4 hours at 65° C. Atmospheric drying.

The other main components of fly ash were also investigated. Reagent grade $Al_2O_3$, $Fe_2O_3$, and $H_2SiO_3$ (silicic acid) were used as a source of alumina, iron, and silica, respectively. Fly ash was simulated as a mixture of three substances: 49% $H_2SiO_3$, 29% and 22% $Fe_2O_3$ (weight %). Atmospheric drying was used for the preparation of samples. The results are presented in FIG. 5, giving the conversion of $Ca(OH)_2$ at RH 54%. During these experiments $Ca(OH)_2$ was slurried with additives for 4 hours at 65° C. As can be seen from FIG. 5, 1.6 g of mixture slurried with 0.4 g of $Ca(OH)_2$ modelled closely the utilization when fly ash I was used (30 and 27%, respectively). This again implies that calcium content of fly ash is not of primary importance, since the utilization of added $Ca(OH)_2$ was even higher when no fly ash-bound calcium was present. Next 0.4 g of $Ca(OH)_2$ was slurried separately with each component used to simulate the fly ash. Component loading was kept the same as it was when 1.6 g of mixture was used (i.e., 0.78 g, 0.47 g, and 0.35 g of $H_2SiO_3$, $Al_2O_3$, $Fe_2O_3$ were used, respectively).

Figure 4:
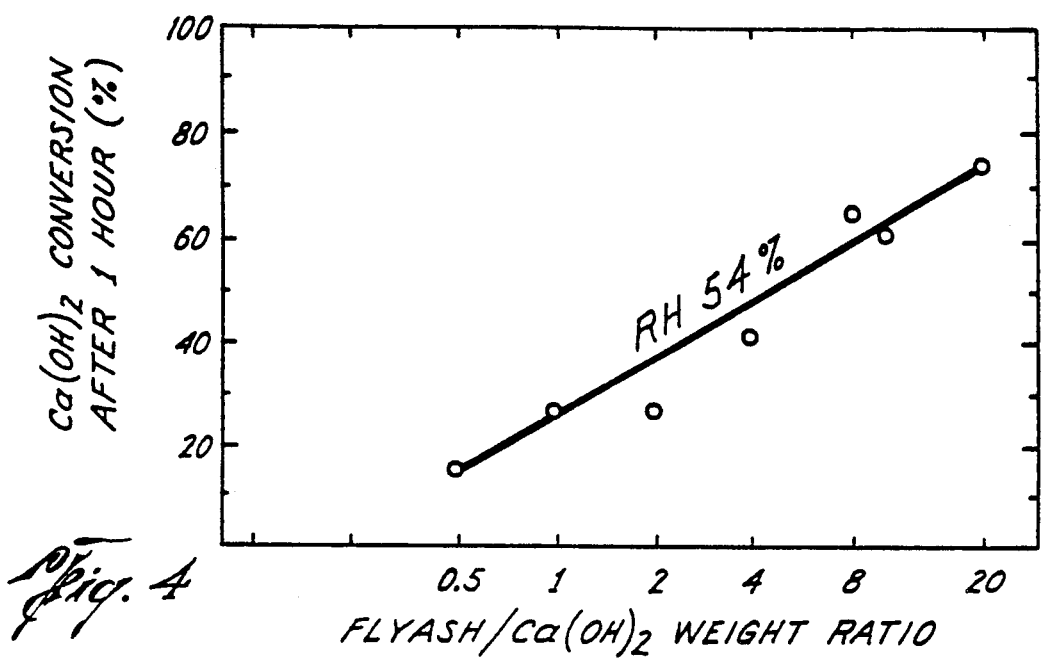
FIG. 4. The effect of fly ash I loading (g fly ash/g $Ca(OH)_2$) on lime utilization. Samples slurried for 4 hours at 65° C. Atmospheric drying.
Figure 6:
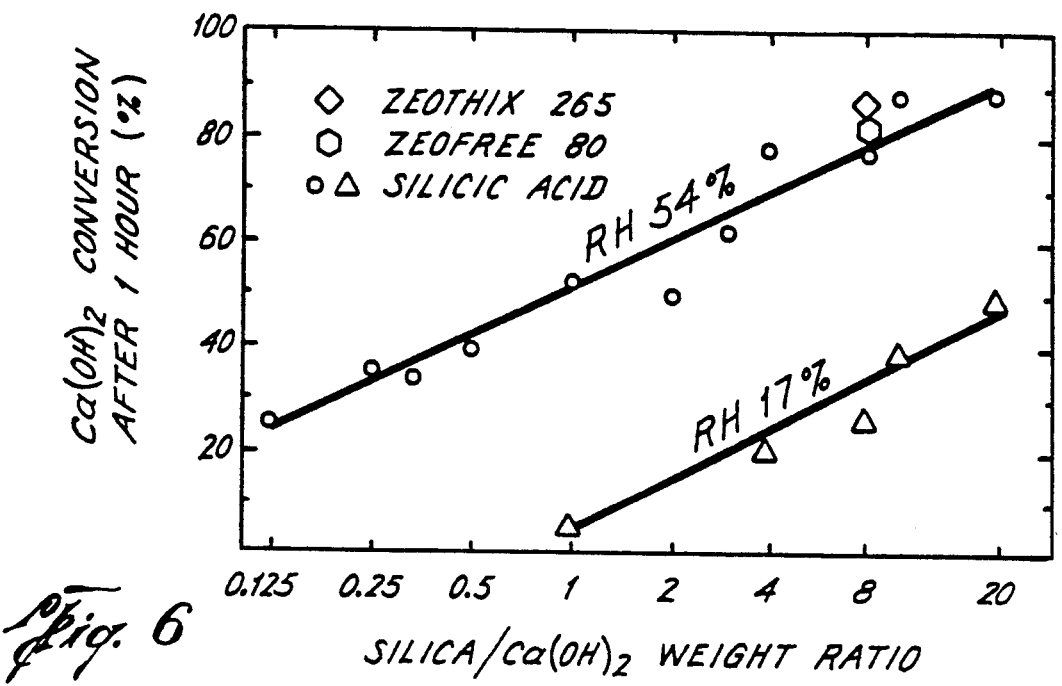
FIG. 6. The effect of silica ($H_2SiO_3$, Zeothix 265, or Zeofree 80) loading (g silica/g $Ca(OH)_2$) on time utilization. Atmospheric drying.

The addition of silicic acid had the most significant effect, increasing $Ca(OH)_2$ utilization from 12 to 40%. No $SO_2$ removal was observed when silicic acid alone was exposed to simulated flue gas. FIG. 6 gives the effect of silica loading on conversion at RH 17 and 54%. Silicic acid was used for most of these experiments. SEM photographs were taken of samples of silicic acid/$Ca(OH)_2$ slurried at 65° C. for 4 hours at silicic acid loading of 4 and 10, respectively. In both, highly developed surface of irregularly shaped particles were seen. Some experiments were performed with artificial precipitated silicas of extremely high surface areas. They were Zeothix 265 and Zeofree 80 of surface area 250 and 140 $m^2/g$, respectively (samples and surface area data obtained courtesy of Huber Corp.). However, these substances did not enhance $Ca(OH)_2$ utilization significantly better than silicic acid (FIG. 6). As can be seen from FIG. 6, both values of RH tested, $Ca(OH)_2$ utilization increased with the increasing loading of silicic acid. The comparison of the results presented in FIGS. 4 and 6 shows that silicic acid promotes $Ca(OH)_2$ utilization better than fly ash. For example, at RH 54% and fly ash loading of 8 (total fly ash) the conversion of $Ca(OH)_2$ was 78% when silicic acid was used and 61% when fly ash I was used.

Reactivities of fly ash and silicic acid should be compared on the basis of silica content. Assuming that fly ash I is 50% silica, a silicic acid loading of 8 should be compared to fly ash I loading of 16 (conversions of 78 and 68%). The difference between silicic acid and fly ash is more apparent at lower loadings. For silicic acid loading of 1, conversion was 53% and for the fly ash I loading of 2 it was 32%. This comparison shows that $Ca(OH)_2$ conversion depends on the reactivity of siliceous material used.

Experiments were performed at RH of 54% with precipitated calcium silicate XP-974 (also from Huber Corp., surface area of 215 $m^2/g$, average particle size 6.1 um). The sample was taken "as received" and was not slurried. As SEM photograph of this sample showed the particle of calcium silicate as having an irregular surface area similar to that produced when silicic acid and Ca(OH)$_2$ were slurried.

Figure 7:
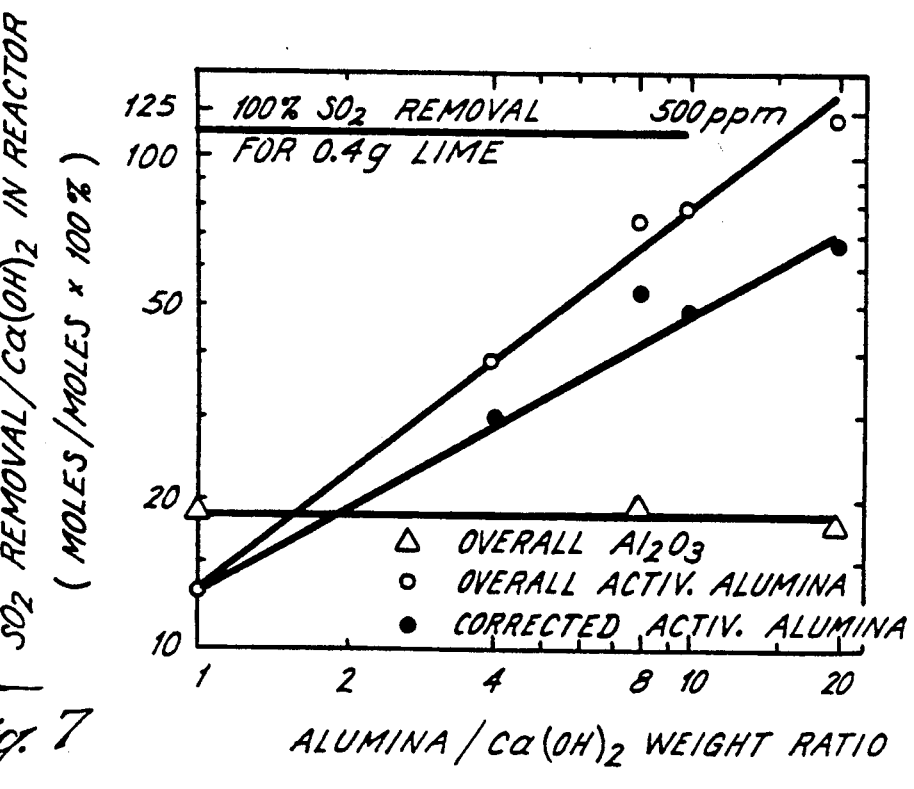
FIG. 7. The effect of alumina loading (g alumina/g $Ca(OH)_2$) on lime utilization. Atmospheric drying.

The effect of alumina loading was tested using two sources of alumina. The results of experiments at 54% RH are shown in FIG. 7. As can be seen, when reagent grade Al$_2$O$_3$ was used, increasing the loading did not change SO$_2$ removal. No SO$_2$ removal was observed for Al$_2$O$_3$ alone. The removal increased with increasing loading of alumina when activated alumina of chromatographic grade (80–200 mesh) was used. However, activated alumina alone removed SO$_2$. The adsorptive capacity of activated alumina was calculated as 0.023 g of SO$_2$ per gram. Based on this value, the corrected SO$_2$ removal has been determined due to the possible formation of calcium aluminates. The empty points in FIG. 7 (o) represent the overall removal of SO$_2$ while the filled points (o) show the corrected values. These corrected values are lower than the ones observed for the same loading when silicic acid was used instead of alumina. Therefore, the silica content of fly ash is mainly responsible for the enhancement of Ca(OH)$_2$ utilization.

The Effect of Slurrying Conditions

Figure 8:
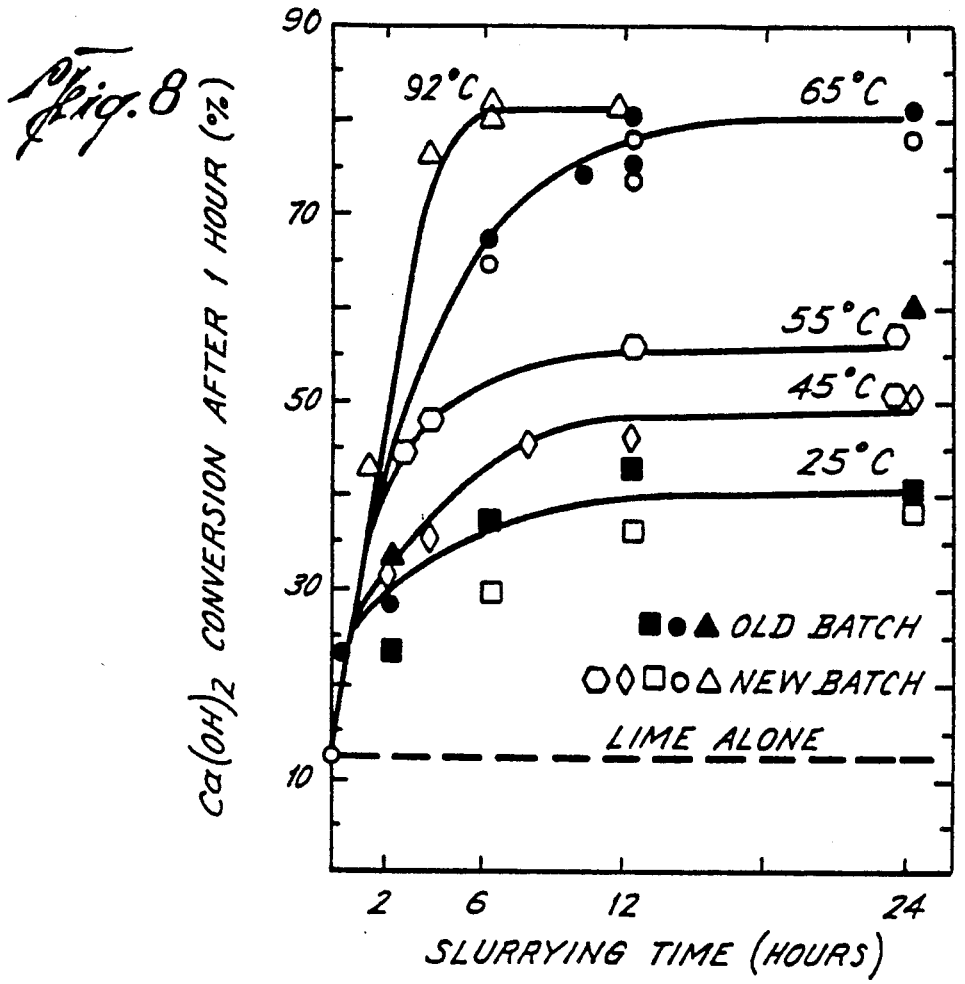
FIG. 8. The effect of fly ash IV on $Ca(OH)_2$ reactivity. Fly ash IV loading 16. Vacuum drying.

Slurrying tests were performed at 25, 45, 55, 64, and 92° C. and time was varied from 2 to 24 hours. The samples for these tests were prepared by vacuum filtration and vacuum drying. Both old and new batches of fly ash IV were used as a source of silica at 16 g fly ash/g Ca(OH)$_2$. Relative humidity during exposure was 54%. The results are presented in FIG. 8.

As can be seen, the temperature was the decisive parameter affecting the process. The results show that there is a critical slurrying time for every temperature tested after which Ca(OH)$_2$ conversion reaches a maximum value. Ca(OH)$_2$ conversion converged on 40% after 16 hours of slurrying at 25° C. and 80% after 5 hours at 92° C. It took 15 hours to converge on 80% conversion of Ca(OH)$_2$ when slurrying at 65° C. Compared with 12% utilization of Ca(OH)$_2$ alone at 54% RH, the 80% utilization of fly ash/Ca(OH)$_2$ slurried at 65° C. was dramatically improved.

The maximum utilization of Ca(OH)$_2$ is not a uniform function of slurry temperature (40, 50, 55, 80, and 80%, for 25, 45, 55, 65, and 92° C., respectively). There appeared to be a discontinuity between 55 and 65° C. slurrying temperature that may indicate a change in the hydration state of the calcium aluminum silicate. The resulting solid had better reactivity for SO$_2$ removal than that formed below 65° C. When tested by Differential Scanning Calorimeter (DSC) the solids formed at 65° C. and 92° C. have an additional endothermic peak between 416 and 465K. No peak was observed for samples slurried at 25, 45 and 55° C. The effect of a step change in reactivity also took place when fly ash III was slurried with Ca(OH)$_2$ at the fly ash loading of 16:1 at 65 and 45° C. The conversion of Ca(OH)$_2$ was 63 and 43%, respectively.

SEM photographs were taken to document the development of the surface area of the samples. In samples slurried for "0" time, separate fly ash spheres with smooth surfaces (as in an unslurried fly ash) and irregular particles of lime were seen. After 24 hours of slurrying at 25° C., the particles were covered with tiny deposits. The product on the surface of the fly ash became more densely precipitated after 24 hours of slurrying at 65° C. Increasing the temperature of slurrying to 92° C. resulted in a very well developed surface area of the deposit.

The Effect of Calcium Sulfite/Sulfate

Calcium sulfite or calcium sulfate were slurried with Ca(OH)$_2$ to simulate the recycle of spent lime. Laboratory produced calcium sulfite hemihydrate (90% CaSO$_3$ 12H$_2$O+10% CaSO$_4$) and reagent grade calcium sulfate dihydrate were used in these experiments. Vacuum drying was used for the preparation of the samples. Samples of fly ash IV/Ca(OH)$_2$/CaSO$_3$ at a weight ratio of 16:1:4 were slurried for 6 hours at 25, 45, and 65° C. The resulting conversions of Ca(OH)$_2$ were 41, 61, and 74%, respectively. Conversion of the fly ash/Ca(OH)$_2$/CaSO$_3$ sample at a weight ratio of 16:1:4 slurried for 6 hours at 65° C. was higher than conversion of the corresponding fly ash/Ca(OH)$_2$ sample at a weight ratio of 20:1, which was 70%. Samples at a weight ratio of 16:1:1 were slurried for 6 hours at 25 and 65° C. and yielded Ca(OH)$_2$ conversions of 21 and 61%, respectively. SEM photographs of the fly ash IV/Ca(OH)$_2$/CaSO$_3$ samples at weight ratios of 16:1:4 and 16:1:1 demonstrated long crystals that may be calcium aluminate sulfate hydrates (ettringite) of general formula 3CaO Al$_2$O$_3$ 3CaSO$_4$ xH$_2$O (x is most often within the range 30–32). These long crystals were not formed when only calcium sulfite was slurried with Ca(OH)$_2$ for 6 hours at 65° C. and at the weight ratio of 4:1 (Ca(OH)$_2$ conversion was 16%). Separate clusters of calcium sulfite and Ca(OH)$_2$ were visible by SEM. It may be that the formation of ettringite provides additional potential for SO$_2$ removal.

Two ratios of fly ash/Ca(OH)$_2$/calcium sulfate were tried. At a ratio of 16:1:4, Ca(OH)$_2$ conversion was 60% for samples slurried for 6 hours at both 25 and 65° C. At a lower ratio of 16:1:1, the conversion was 51 and 31% for samples slurried for 6 hours at 65 and 25° C., respectively. SEM photographs of the sample at a weight ratio of 16:1:4 slurried for 6 hours at 65° C. revealed fly ash speres with the precipitate on the surface, as well as calcium sulfate and long crystals (ettringite).

Both calcium sulfite and calcium sulfate improved the utilization of Ca(OH)$_2$ after slurrying the samples for 6 hours at 25° C. and a weight ratio of 16:1:4. However, at a fly ash/Ca(OH)$_2$/CaSO$_3$ ratio of 16:1:1, the conversion for samples slurried for 6 hours at 25 and 65° C. was lower than when fly ash was slurried at the same conditions with Ca(OH)$_2$ alone (21, 61, and 67%, respectively).

The Effect of Fly Ash Particle Size

Fly ash IV was wet-sieved into five fractions which are characterized in Table II. The fractionated fly ash was slurried with 0.4 g of Ca(OH)$_2$ at a loading of 16 for 6 hours at 65° C. Vacuum drying was used for the preparation of samples. The results of these experiments are shown in Table II. Also shown in Table II is the base case conversion of Ca(OH)$_2$ when it was slurried with fly ash IV ("natural"-whole spectrum of particle size). Calculated weighted average from obtained fractional conversions was 52%. The reason why the weighted average is lower than the base case (52 and 67%, respectively) may be that imperfect wet-sieving left fine particles agglomerated with coarse fractions. The general trend was that for the same fly ash loading, the conversion increased with the decreasing particle size of fly ash. An increase of the fly ash loading from 156 to 30 when the finest fraction of fly ash was used (d<20 um)

resulted in an increase of Ca(OH)$_2$ conversion from 76 to 92%. An increase of fly ash loading from 16 to 25 when coarser fraction was used (45 um<d<75 um) resulted in an increase of Ca(OH)$_2$ conversion from 42 to 52%.

TABLE II

Fractional Characterization of Fly Ash IV

| Fraction Ca(OH)$_2$ | Particle Diameter [um] | Weight Fraction [%] | Composition[1] Ca | Si | Conversion |
|---|---|---|---|---|---|
| 1 | d ≦ 125[1] | 15 | 12 | 63 | 24 |
| 2 | 75 < d ≦ 125 | 13 | 8 | 55 | 28 |
| 3 | 45 < d ≦ 75 | 20 | 9 | 60 | 43 |
| 4 | 20 < d ≦ 45 | 12 | 14 | 67 | 50 |
| 5 | d ≦ 20 | 40[2] | 14 | 63 | 77 |
| 6 | 0 < d ≦ 125+ | 100 | 15 | 68 | 67 |

[1]weight percent, normalized Energy Dispersion Spectrometry results.
[2]All losses during wet-sieving assumed for the finest fraction.

Alternate Sources of Silica

Several alternative sources of silica were tested. These included siliceous clays (kaolinite and bentonite) and talc (MgO 4SiOSO$_2$H$_2$O). Kaolinite of the molecular composition Al$_2$O$_3$ 2SiO$_2$ 2H$_2$O is the principal constituent of kaolin and the most frequently occurring component of clays. Bentonite (montmorillonite clay) of general formula Al$_2$O$_3$ 4SiO H$_2$O exists as very fine particles (up to 60% below 0.1 um), which form colloidal solutions with water. Montmorillonite No. 24 (Ward's Classification) was tested. All samples were slurried for 6 hours at 65° C. at clay loading of 2. Montmorillonite was also tested at loading of 16. The coversions of Ca(OH)$_2$ Were 39, 25, and 23% for montmorillonite, kaolinite, and talc, respectively (at loading of 2). At similar slurrying conditions and loading of 2, fly ash I promoted Ca(OH)$_2$ utilization to 28% (fly ash I slurried at 65° C. for 4 hours only). At montmorillonite loading of 16, it increased the conversion to 61%, which was slightly less than fly ash I and fly ash IV. An SEM photograph was taken of the sample of montmorillonite clay No. 24 slurried with reagent grade Ca(OH)$_2$ at loading of 16 for 6 hours at 65° C. The highly irregular particle surface which was observed was reminiscent of the appearance of silicic acid/Ca(OH)$_2$ samples and of the deposit on the surface of the fly ash spheres.

In conclusion, enhanced performance of spray dryer/bag filter systems with recycle of fly ash an calcium solids is probably due to the reaction of Ca(OH)$_2$ with fly ash to produce calcium silicates. The calcium silicate solids were found to have greater surface area than the unreacted Ca(OH)$_2$ and are more effective for gas/solid reactions. Moreover, calcium silicates were found to be more reactive than aluminates or ferrites. The available silica content of the fly ash is more important. Increased time and temperature gave more reactive solids from the reaction of lime and fly ash and solids formed above 65° were substantially more reactive than solids formed at lower temperatures.

Experiments with silicic acid and fly ash support the hypothesis that the reaction of added Ca(OH)$_2$ and silica from fly ash is responsible for the enhancement of Ca(OH)$_2$ utilization when slurried with fly ash, as compared with the utilization of lime alone. The newly formed solids are of high surface area and are highly hydrated. Prior to the formation of highly reactive solids of calcium silicate hydrates two steps apparently need to take place: Ca(OH)$_2$ dissolution and digestion of silica from the fly ash. Since Ca(OH)$_2$ dissolution is very fast compared with fly ash dissolution, digestion of silica from fly ash seems to be the rate controlling step. This was confirmed by experiments with silicic acid, precipitated silica, and precipitated calcium silicate. However, the high price of precipitated silica ($750-1750/ton) make it noneconomic. Therefore enhanced calcium silicate hydrate formation should be sought by carefully selecting slurrying conditions rather than using costly additives.

Experiments showed that increasing slurrying time and temperature can dramatically enhance the utilization of Ca(OH)$_2$. At each temperature the Ca(OH)$_2$ utilization asymptoted to a specific maximum value with increasing time. The time needed to achieve the maximum utilization varied and was generally higher for lower slurrying temperatures. A step increase of reactivity was observed between solids slurried at 55 and 65° C. It took 15 hours to converge on 80% conversion of Ca(OH)$_2$ at 65° C.

When lime was slurried with fly ash and calcium sulfite or calcium sulfate the formation of ettringite was observed. The addition of calcium sulfite/sulfate enhanced utilization when slurried at 25° C. at the fly ash/lime/calcium salt weight ratio of 16:1:14. The effect was dramatic when calcium sulfate was used.

Experiments with clays as an alternate source of silica proved that they also may be effective in the formation of calcium silicate hydrate. Montmorillonite performed as well as fly ash at a loading of 2. At high loading it was only slightly less effective. The use of clays in the place of fly ash offers the advantage of uncontaminated by-product fly ash.

Also from the above presented results it becomes clear that fly ash TAMO (total alkaline metal oxide content) has no decisive effect on the removal of SO$_2$ in the spray dryer when slurried alone, the recycle of spray dryer/bag filter off-product provides the opportunity for unspent Ca(OH)$_2$ to be reacted with fly ash in addition to providing the unspent Ca(OH)$_2$ with another chance to see and react with SO$_2$, enhancing the reaction of Ca(OH)$_2$ with fly ash in the recycle system should improve the overall performance of the spray dryer/bag system.

The advantage of highly reactive solids may be fully utilized in a commercial unit after optimization of the recycle conditions. Presently it is commercial practice to design the recycle tank for about 2 hours residence time. At ambient temperature or adiabatic conditions the effect of heat evolving when warm spray dryer solids are added is negligible. As shown by the results of this study, it would be preferred to increase the size of recycle tank up to 6 hours, preferably even 8 hours. The temperature of the slurry should preferably not be lower than 65° C. to take advantage of a steep change in a reactivity of solids. One option to provide the necessary amount of heat would be to add fly ash directly to the CaO slaker. The recycle tank should be designed carefully to avoid problems with plugging from reaction products and excessive deposit built-up on the walls.

It is possible that the spray dryer could be operated with wider approach to the saturation temperature because more reactive solids would be sprayed. Additional increase of Ca(OH)$_2$ reactivity in the fly ash-Ca(OH)$_2$ system might be possible with deliquescent salt additives. Sand bed studies showed the increase of Ca(OH)$_2$ reactivity when calcium and sodium salts were used. Sodium and calcium salts are widely used as cement retarders and by analogy they should work well also in the fly ash system.

The lab scale experiments also indicate that dry injection of solids into the duct should be accompanied by humidification of the gas. High humidification could be used in installations with ElectroStatic Precipitators (ESP). One option is that the dry solids would be produced outside the system and then injected into the duct and later humidified. Second is that the reacted slurry of fly ash and lime would be introduced into spray dryer operating at wide approach to the saturation. This spray dryer would operate as dryer and absorption of $SO_2$ would be of secondary concern. Spray dryer-dry solids would be then passed into the duct where they would contact humidified gas. Dry injection in the system with ESP requires additional laboratory studies of the rates of reaction at short times.

The idea of producing the reactive solids could be also retrofitted into existing desulfurization installations. It should be feasible for example to collect the product solids from Limestone Injection Multistage Boiler (LIMB), slurry them at favorable conditions and redistribute. The typical product of LIMB is CaO, $CaSO_4$, and fly ash at the ratio of 3:1:2, which could be simulated in sand bed reactor.

Still another possibility would be Slurry Atomization into Multistage Burner (SAMB) which would consist of spray drying of lime/fly ash slurry at burner temperatures and collecting the dry solids in either ESP or bag filter after additional humidification in the duct.

EXAMPLE II: THE EFFECT OF NaOH ADDITION TO THE SLURRY

Figure 9:
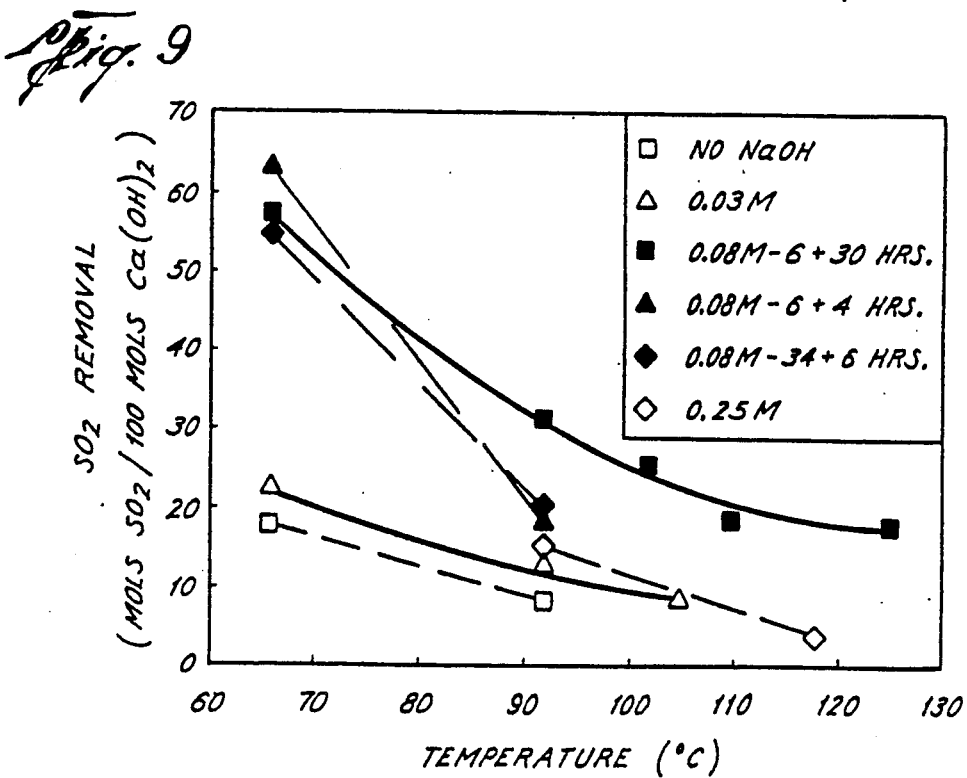
FIG. 9. Effect of NaOH concentration on $SO_2$ removal. 1 $Ca(OH)_2$:4 Fly Ash:4 $CaSO_3$—10 mol % NaOH; Removal after 1 hour; 500 ppm $SO_2$; 500 ppm $NO_x$; 14 mol % $H_2O$; gas flow: 4.6 l/min - 7% $O_2$, 10% $CO_2$; 83% $N_2$.

It has also been observed that the addition of sodium hydroxide to the slurry serves to potentiate the slurry's sulfur-adsorbing capability, possibly due to the increased formation of calcium silicates and aluminates at more alkaline pH's. In FIG. 9, about 1 part $Ca(OH)_2$ was slurried at 65° C. for 6 hours with 4 parts fly ash and 4 parts $CaSO_3$, but without the addition of NaOH. $SO_2$ removal (moles $SO_2$/100 moles $Ca(OH)_2$) ranged from about 20, when solids were reacted with gas at about 65° C., to about 10, when reacted with gas at about 92° C.

When 0.03M NaOH was added to a level of 10 mole %, the $SO_2$ removal ranged from about 22, when reacted with gas at 65° C., to about 10, when reacted with gas at about 105°. When 0.08M NaOH was added after the slurry was slurried for 6 hours, and then dried an additional 30 hours in the presence of the added NaOH, the $SO_2$ removal increased to a range of about 58, when reacted with gas at 65° C., to about 30, when reacted with gas at about 92° C., and to about 22, when reacted with gas at about 125° C. When this concentration of NaOH was slurried for only 4 hours, the $SO_2$ removal observed ranged from about 64, at 65° C., to about 20, at 92° C. A longer slurrying time prior to NaOH addition gave similar results. The addition of 0.25M NaOH demonstrated only slight improvement over control. However, in all cases, it was observed that the addition of NaOH to the slurry improved $SO_2$ removal efficiency.

SORBENTS PREPARED AT TEMPERATURES BETWEEN 100° and 200° C.

Figure 10:
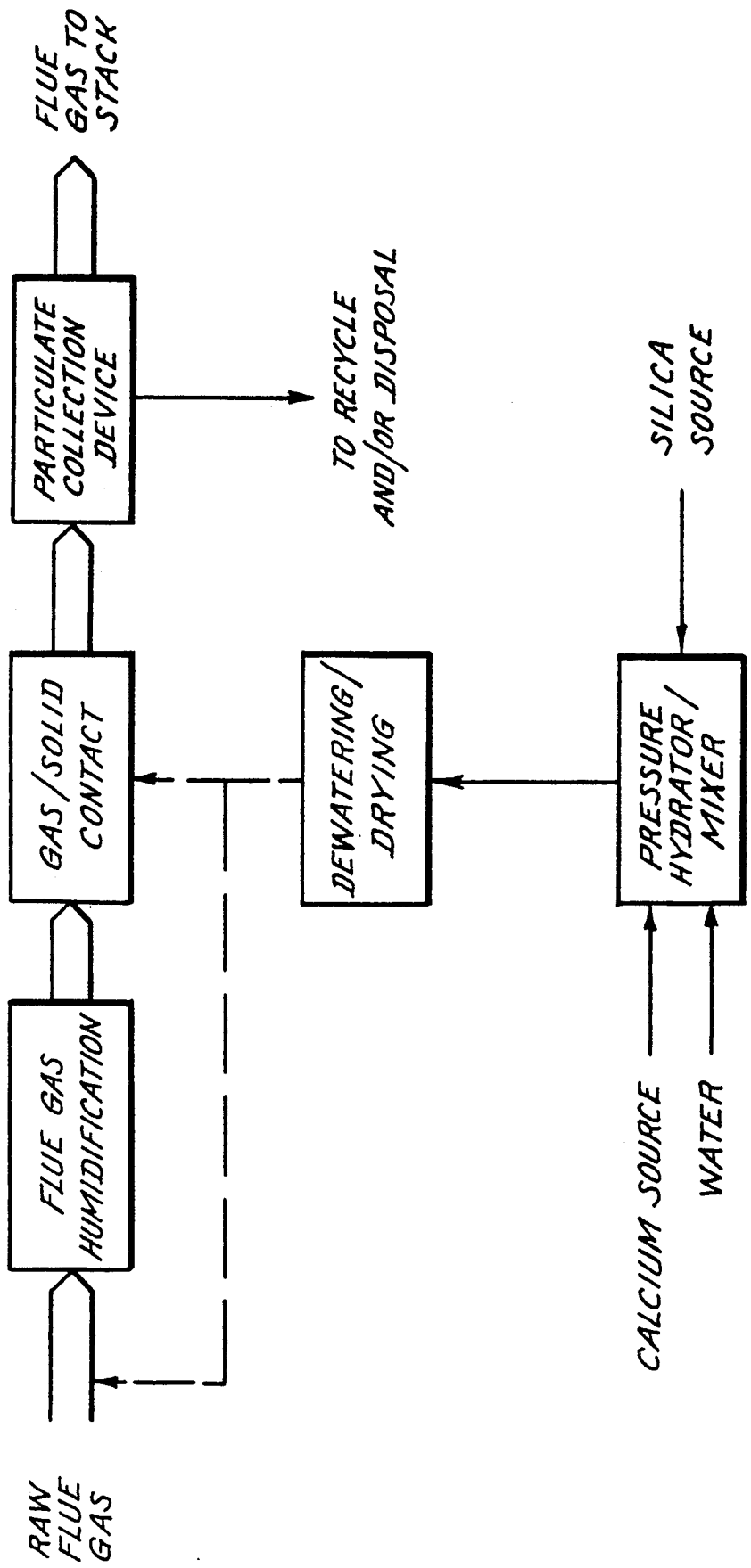
FIG. 10. Generalized process schematic for high temperature sorbent preparation and use.

A generalized flowsheet including the major embodiments of processes according to this aspect of the invention is shown in FIG. 10. The sorbent is prepared by mixing water, calcium source, and the silica source in a pressurized hydrator/mixer at elevated temperature. A sufficient quantity of water (greater than 60 wt. %) is added to maintain the mixture in a slurry form, the water acting as a medium for reactions between lime and silica source to form calcium silicate hydrates. As with temperatures below 100°, at pressure hydration temperatures above 100° and below 200° C., virtually any composition which includes a source of calcium alkali [CaO or $Ca(OH)_2$] may be employed in the practice of the present invention. For example, calcium alkali in the form of lime, slaked lime, hydrated lime, calcitic lime, dolomitic lime, carbide lime, calcium hydroxide or calcium oxide may be employed. For economic reasons, due to its lower cost, a preferred embodiment of the present invention employs lime or slaked lime.

Similarly, virtually any composition which includes a calcium reactive silica may be employed, wherein a calcium-reactive silica is defined as a source of silica which is readily soluble in alkaline solutions. Such compositions include, but are not limited to, fly ash, diatomaceous earth, clay, bentonite, montmorillonite, or silicic acid. Again, for economic reasons, one would generally prefer to employ fly ash in that fly ash is a natural by-product of coal combustion and is therefore readily available at coal burning power plants. Moreover, fly ash may be included in the slurry in the form of spent solids recycled. When fly ash and lime are the raw materials, the weight ratio is preferably in the range of 1:1 to 3:1. when clay, diatomaceous earth or recycle solids is used as the silica source and lime is the calcium source, the silica to calcium ratio is preferably less than 2:1. The current invention enables the use of relatively low fly ash/lime or silica/calcium ratio to reduce the raw material consumption rate, the size of the hydrator and the energy requirement.

Another step of the most general process of the present invention involves heating the slurry to an optimum temperature range or thermal window and maintain the slurry temperature within the thermal window for a period of time. Since the optimum temperature range is higher than 100° C., the pressure inside the hydrator/mixer is necessarily kept above atmospheric pressure. The preferred temperature range of this thermal window varies with the type of silica used, the ratio of calcium/silica mixed and the mixing time employed. In the case of a typical coal-fired power plant using lime and fly ash (including fly ash in recycled solids from the particulate collector), the temperature range of the preferred thermal window will typically be on the order of about 110 to 180° C. and a corresponding pressure range of about 20 to 100 psia. An even more preferred temperature window ranges from between about 140° and 160° (3 to 7 psia), wherein a particularly active sorbent is produced. The fly ash to lime weight ratio charged to the hydrator is preferably controlled in the range of 1:1 to 3:1.

However, broadly speaking, advantages may be realized with virtually any of the aforementioned calcium and silica sources, wherein the sorbent activation is conducted at between about 100° and 200° C. (1 to 15 psia). Controlling the temperature and pressure to within this thermal window is believed to result in the production of a highly sulfur-reactive species of calcium silicate hydrate.

Another advantage of the above described thermal window is the reduced reaction time required to achieve optimal reactivity. For example, at slurrying temperatures below 100° C., optimal reactivity is achieved in 6 to 12 hours or more. However, at temperatures above 100° C., optimal reaction times are reduced to below 4 hours and, at the most preferred range of 140° to 160° C., the optimal reaction time is reduced to less than about 1 hours. The significant reduction in fly ash to lime ratio and reaction time results in considerable savings in capital cost (smaller hydrator, conveyor, and storage tanks) and operating cost (lower energy and raw material consumption) makes the current invention an economical and technically desirable process for application to large coal-fired power plants.

After the slurry has been adequately mixed and heated, a drying means is preferable included to dewater and dry the slurry into discrete, fine powders. In this embodiment, the drying means can be employed in the form of a fluidized bed, flash dryer, spray dryer or other means known in the art. Oven drying followed by crushing and screening can also accomplish the purpose. The drying means may also employ a dewatering device, for example a vacuum or centrifuge device, before the primary drying means.

The dry silicate hydrates are used as the sorbent for dry flue gas desulfurization process. The dry flue gas desulfurization process includes a means for humidifying the flue gas, means for admixing the flue gas with the solid component to provide a gas/solid suspension, and means for separating the solid product from the gas/solid suspension before the flue gas is directed to a stack as shown in FIG. 10.

The most convenient means of achieving a humidification of gas will be through the utilization of water, for example, mixed with the gas with a spray of fine water droplets. The gas is preferably conditioned to a relative humidity of between about 20 to 90%. Additionally, the temperature of the hot flue gas (generally between about 150 and 300° C.) is preferably conditioned to between about 50 and 100° C.

The dry calcium silicate hydrates can be transported into the flue gas stream by conventional dry solids injection means such as pneumatic or mechanical conveyor. The means for admixing the flue gas and the injected sorbent can be a section of ductwork, a gas/solid contractor such as a moving bed or a circulating fluidized bed, or the like.

It is commonly known in the art that low flue gas temperature and high humidity increase sulfur dioxide solubility and reactivity with sorbent. The gas/solid admixing means provides intimate sulfur dioxide/sorbent contact and lengthens the contact time which would enhance mass transfer and overall sulfur dioxide removal efficiency.

Following the gas/solid admixing, the sorbent used and sulfur dioxide absorbed should be separated from the gas stream. The separating means including baghouse, electrostatic precipitator, mechanical impactor or cyclone. Additional sulfur dioxide removal is obtained if a long solids residence time device such as a baghouse is used as the particulate collector. The solids collected can be recycled to the hydrator as the silica source to produce more reactive calcium silicate hydrates for further sulfur dioxide removal.

EXAMPLE III: SORBENTS PREPARED AT ELEVATED TEMPERATURES

Various experiments have been performed in support of this aspect of the invention. Calcium silicate hydrates were prepared in a pressure reactor (300 ml) by mixing lime and siliceous material at elevated temperature. The pressure reactor was equipped with a stirrer and an electrical heater controlled by a thermocouple inside the reactor. After reactants (lime and siliceous material) were placed in the reactor, the vessel was sealed and heated electrically. Pressurized water was injected into the reactor when the temperature reached the experimental value. The reactants and water were vigorously stirred for a designated time period. After completion of each lo run, the reactor vessel was opened and the product was removed and dried.

The reactivity of the calcium silicate hydrates produced was evaluated in an apparatus similar to that shown in FIG. 2 and discussed above. Briefly, a glass reactor (40 mm in diameter, 120 mm in height) was packed with the dried calcium silicate hydrates mixed with 40 g of 100 mesh, silica sand to prevent channelling. The reactor was immersed in a water bath thermostated to within approximately 0.1° C. Simulated flue gas was obtained by mixing nitrogen and sulfur dioxide (500 ppm) from gas cylinders. The flow of gas was monitored using rotameters. Water was metered by a syring pump, evaporated, and injected into dry gas to control the humidity at 60%. The $SO_2$ concentration coming in and going out of the glass reactor was measured with a pulsed fluorescent $SO_2$ analyzer (Thermo-Electron Model 40). Exposure time of the packed bed to the gas was 1 hour. The reactivity of the calcium silicate hydrates tested was described by conversion of lime [$Ca(OH)_2$] added to the reactor. Conversion of $Ca(OH)_2$ is the number of moles of $SO_2$ reacted per mole of $Ca(OH)_2$ used, multiplied by 100 percent.

Figure 11:
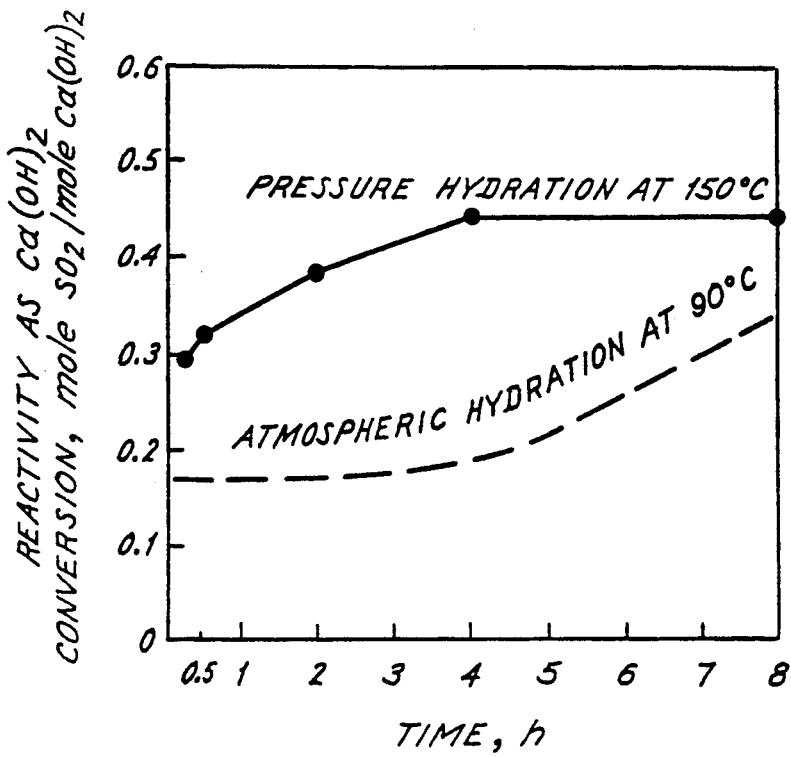
FIG. 11. Effects of pressure hydration on the reactivity of calcium silicate hydrates prepared at the weight ratio of fly ash to lime of 3:1.

The results of the first set of experiments are presented in FIG. 11 as a plot of product reactivity vs. preparation time (employed for heating the lime and fly ash slurry). The upper curve represents the reactivity of calcium silicate hydrates prepared under pressure at 150° C. The lower curve represents reactivity of product prepared in an open beaker at atmospheric pressure and heated to 90° C. It is apparent that the pressure hydration resulted in a much more reactive product than atmospheric hydration. Since the upper curve leveled off after about 4 hours, it means that only 4 hours or less preparation time is required to achieve the maximum effect of pressure hydration.

Figure 12:
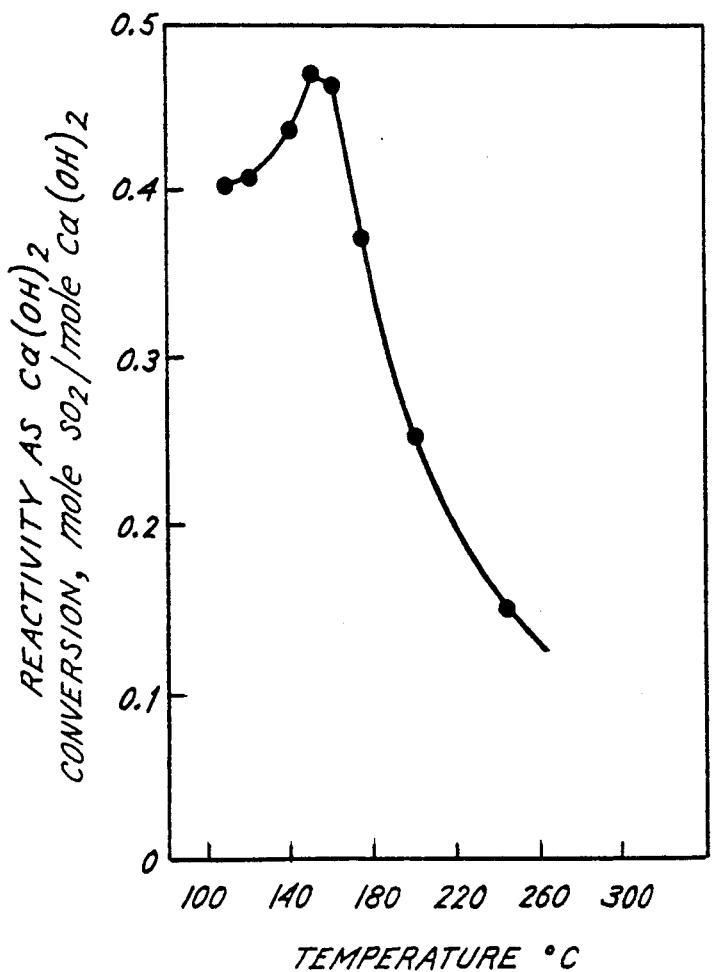
FIG. 12. The effect of temperature of pressure hydration on the reactivity of calcium silicate hydrates prepared at the weight ratio fly ash to lime of 3:1.

The effect of temperature of pressure hydration was investigated during the second set of experiments. As shown in FIG. 12, the reactivity of the calcium silicate hydrates produced under pressure demonstrated surprisingly good reactivities when prepared at temperatures between 100° and 200° C., and peaked at temperature about 140 and about 160° C., evidencing the thermal window effect. The data shown in FIG. 12 indicated that when preparation temperature exceeded 160° C. the reactivity dropped precipitously, with temperatures above 200° C. being much less reactive.

Figure 13:
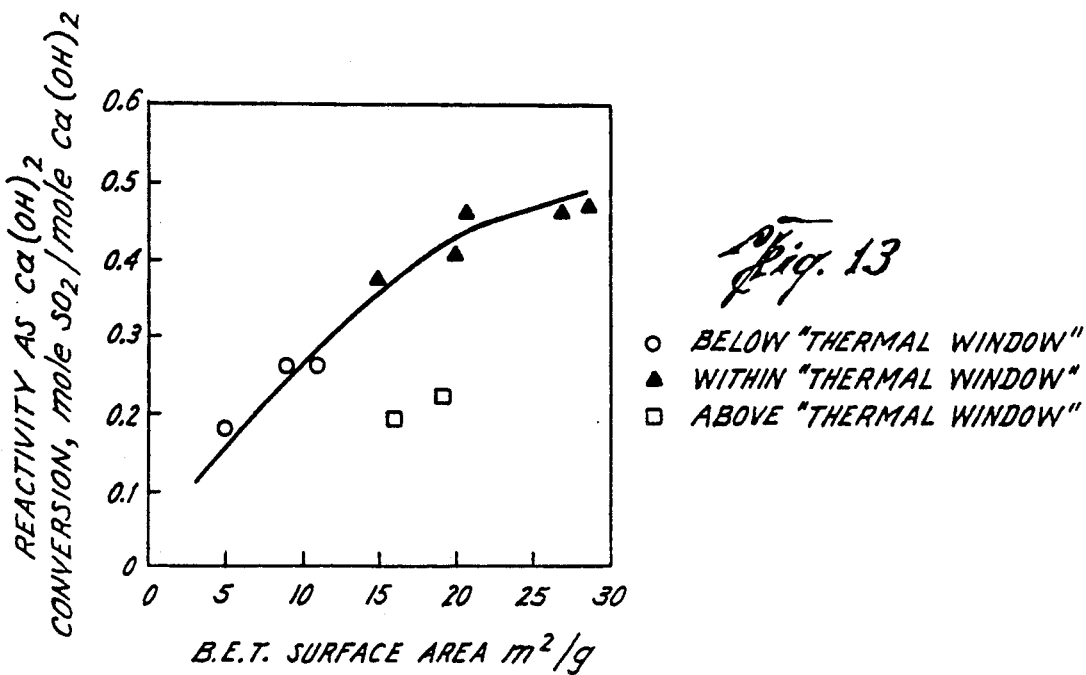
FIG. 13. Correlation between measured B.E.T. surface area and the reactivity of various calcium silicate hydrates prepared from fly ash and lime.

Surface area of the calcium silicate hydrates was measured during a third set of experiments. FIG. 13 represents the correlation of reactivity with B.E.T. surface area. This figure shows that, in general, the reactivity correlated quite well with the B.E.T. surface area and that it increased with the increasing surface area of the product. The three data points expressed as open circles represent reactivity of calcium silicate hydrates produced at temperatures below the thermal window of 140 to 160° C. It is apparent that the surface are of those products had not been fully developed, probably resulting in a shortage of reaction sites and, hence, low reactivities. On the other hand, the two open squares on FIG. 13 represent reactivities of calcium silicate hydrates produced at temperatures higher than the thermal window of 140 to 160° C. The reactivities of those two data points do not fit the correlation curve with B.E.T. surface area as shown in FIG. 13, although moderate to high surface area was obtained, the reactivity was extremely low.

To further investigate the temperature effects on product reactivity, the crystal morphology was examined by scanning electron microscope. It was found that the calcium silicate hydrates produced within the thermal window are gel-like, amorphous particles. However, needle-like, well-defined crystals were formed when the temperature is above the optimal temperature. Apparently, the high temperature caused solid phase transition and a different crystal was formed. This new crystal, although still possessed moderately large surface area, was not nearly as reactive toward sulfur dioxide. It is possible that this new crystal has a composition, e.g., containing very little hydrated water molecule, that is unfavorable toward sulfur dioxide absorption. It is also possible that the high temperature caused structural property changes and resulted in low reactivity. Therefore, the combination of degree of crystallization-transition of the final product's composition and the clay-like structure's temperature sensitivity could account for thermal window effect.

Figure 14:
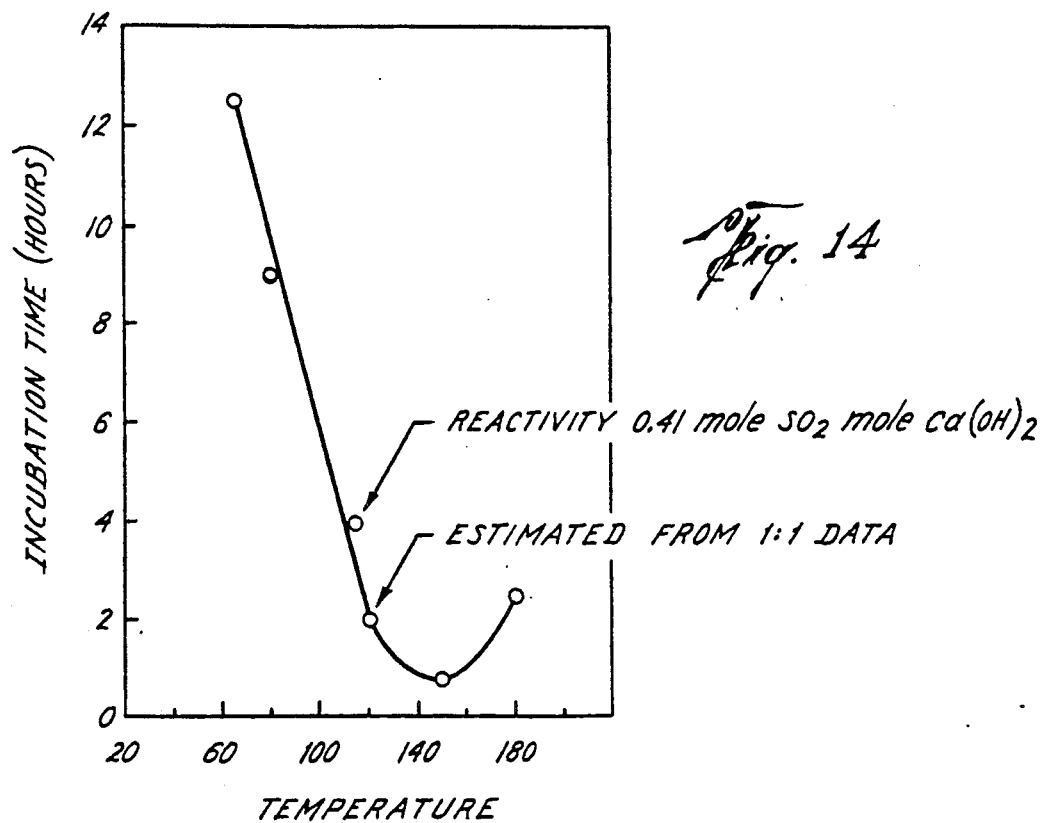
FIG. 14. Correlation between temperature of sorbent preparation and incubation time required to obtain a doubling of sorbent reactivity.

Further experimentation was conducted in order to demonstrate the surprising reduction in treatment time provided by the use of elevated temperatures. In particular, experiments were conducted wherein the incubation times required to approximately double the reactivity of the sorbent were determined. From the results shown in FIG. 14, it is apparent that sorbents produced the reactivity of temperatures above about 100° C. and below about 200° C. are at least doubled in less than 6 hours. Moreover, in the more preferred range of about 120° to about 180° C., reactivities are doubled in less than about 2 hours. Surprisingly, at the most preferred temperature range of about 140° to about 160° C., sorbent reactivities were doubled in less than 1 hour.

What is claimed is:

1. An apparatus for treating a gas stream to remove acid components therefrom, the apparatus comprising:
   a) activating means for activating an acid gas-absorbing component, which component includes a calcium silicate formed from a calcium alkali and calcium-reactive silica or alumina, the activating means including means for elevating the temperature of the component to above ambient prior to contacting said component with a gas stream for a period of time effective to promote activation of acid gas absorbing component;
   b) admixing means, positioned in operable communication with the activating means, to receive activated absorbing component from the activating means, for admixing the activated absorbing component to treat the gas stream by absorbing acid components therefrom; and
   c) separating means, in operable connection with the admixing means, for separating treated gas from the absorbing component.

2. The apparatus of claim 1, wherein the activating means comprises means for slurrying the calcium alkali and calcium-reactive silica or alumina in an aqueous suspension.

3. The apparatus of claim 2, wherein the activating means comprises a slurry tank.

4. The apparatus of claim 1, wherein the activating means comprises means for subjecting the calcium alkali and calcium-reactive silica or alumina to an elevated pressure.

5. The apparatus of claim 4, wherein the activating means includes a pressure hydrator.

6. The apparatus of claim 2, wherein the admixing means comprise means for admixing the gas with the activated absorbing component to provide a gas liquid suspension.

7. The apparatus of claim 6, wherein the admixing and separating means include means for drying the gas liquid suspension to provide a gas/solid suspension, and means for separating the gas/solid suspension to provide a gaseous component and a solid component.

8. The apparatus of claim 7 further comprising means for recycling a portion of the solid component to the slurry means.

9. The apparatus of claim 1 wherein the admixing means includes a spray dryer.

10. The apparatus of claim 1, wherein the separating means includes a bag filter.

11. The apparatus of claim 1 wherein the separating means includes an electrostatic precipitator or cyclone.

12. An apparatus for preparing an acid gas sorbent for use in connection with a coal-fired power plant to reduce the amount of acid gas components in gaseous emissions therefrom, the apparatus comprising a pressure hydrator or temperature-regulated slurry tank, wherein the pressure hydrator or temperature-regulated slurry tank is in operable connection to receive calcium alkali and calcium reactive silica or alumina from an external calcium alkali and calcium-reactive silica or alumina source and deliver activated sorbent to a mixing chamber, the pressure hydrator or temperature-regulated slurry tank for activating an acid gas absorbing component.

13. The apparatus of claim 12 further comprising a separator in the form of a bag filter, electrostatic percipitator or cyclone, positioned in communication with the mixing chamber so as to receive spent sorbent and treated gas therefrom, for separating spent sorbent from the treated gas.

14. The apparatus of claim 12, further comprising a dewatering device connected in communication with the pressure hydrator or temperature-regulated slurry tank to receive activated acid gas absorbing component therefrom, the dewatering device for removing water from the acid gas absorbing component.

15. The apparatus of claim 13, further comprising a venting stack, connected in operable communication with the separator, to receive treated gas therefrom and vent the treated gas.

16. The apparatus of claim 12, further comprising a dry injection device, positioned in operable communication with the pressure hydrator or temperature regulated slurry tank for receiving sorbent therefrom and admixing the sorbent with gas to be treated.

17. The apparatus of claim 12, further comprising a fluidized bed, flash dryer or spray dryer positioned in operable communication with the mixing chamber.

18. The apparatus of claim 12, further comprising a gas humidifier positioned in communication with a gas source of gas to be treated and the mixing chamber for humidifying the gas to be treated.

19. The apparatus of claim 12, further comprising a baghouse or electrostatic precipitator positioned in communication with the mixing chamber.

20. The apparatus of claim 12, wherein the calcium-reactive silica or alumina source comprises a fly-ash source.

21. The apparatus of claim 12, further comprising means, connected to said pressure hydrator or temperature-regulated slurry tank, for admixing activated sorbent with dry solids to provide a free-flowing, semi-dry sorbent.

22. An apparatus for reducing the level of acid gas components in a gas stream, the apparatus comprising:
 a) a source of calcium alkali and calcium-reactive silica or alumina;
 b) an activation device connected in operable communication with said source o receive calcium alkali and calcium-reactive silica or alumina therefrom, for activating the calcium alkali and calcium-reactive silica or alumina to produce an acid gas absorbing component that includes calcium silicate;
 c) a mixer, connected in operable communication with said activation device, the mixer adapted to bring the calcium silicate absorbing component into contact with a gas stream in a manner effective to treat gas to reduce the level of one or more acid components therein; and
 d) a separator, connected in operable communication with said mixer, that separates the absorbing component from treated gas stream.

23. The apparatus of claim 22, wherein the activation device comprises a temperature-regulated slurry tank or pressure hydrator.

24. The apparatus of claim 22, wherein the mixer comprises a rotary or fluid atomizer.

25. The apparatus of claim 22, wherein the separator comprises a spray dryer or bag filter.

26. The apparatus of claim 22, further comprising a dewatering device connected in operable communication with the mixer.

27. The apparatus of claim 22, further comprising an atomizer connected in operable communication with the mixer.

28. An apparatus for reducing the level of acid gas components in a gas stream, the apparatus comprising:
 (a) a gas/solid separator in contact with a gas stream for collecting solids that include fly ash and calcium oxide or hydroxide;
 (b) a temperature-controlled slurry tank connected to the gas/solid separator, the slurry tank for producing an activated sorbent;
 (c) admixing means for admixing solids from the separator with activated sorbent from the slurry tank, to produce free flowing solids;
 (d) means, connected to the admixing means or slurry tank, for injecting the free-flowing solids into the gas stream; and
 (e) means, connected to the slurry tank or admixing means, for conveying solids from the gas/solid separator to the slurry tank or admixing means.

29. The apparatus of claim 28, wherein the admixing means further comprises a dewatering or drying device for partially dewatering or drying activated slurry.

30. The apparatus of claim 28, wherein the gas/solid separator comprises an electrostatic precipitator, bag filter, or cyclone.

* * * * *

UNITED STATES PATENT AND TRADEMARK OFFICE
CERTIFICATE OF CORRECTION

PATENT NO. : 5,270,015
DATED : December 14, 1993
INVENTOR(S) : Rochelle et al

It is certified that error appears in the above-indentified patent and that said Letters Patent is hereby corrected as shown below:

Claim 22, Column 1, line 17, delete "o" and substitute --to--.

Signed and Sealed this

Twelfth Day of July, 1994

Attest:

BRUCE LEHMAN

*Attesting Officer*    *Commissioner of Patents and Trademarks*